US010042100B2

(12) United States Patent
Inoue

(10) Patent No.: US 10,042,100 B2
(45) Date of Patent: Aug. 7, 2018

(54) MULTILAYERED FILM AND METHOD OF MANUFACTURING MULTILAYERED FILM

(75) Inventor: Kyosuke Inoue, Tokyo (JP)

(73) Assignee: ZEON CORPORATION, Tokyo (JP)

(*) Notice: Subject to any disclaimer, the term of this patent is extended or adjusted under 35 U.S.C. 154(b) by 627 days.

(21) Appl. No.: 14/001,617

(22) PCT Filed: Feb. 21, 2012

(86) PCT No.: PCT/JP2012/054137
§ 371 (c)(1),
(2), (4) Date: Aug. 26, 2013

(87) PCT Pub. No.: WO2012/117897
PCT Pub. Date: Sep. 7, 2012

(65) Prior Publication Data
US 2013/0329290 A1 Dec. 12, 2013

(30) Foreign Application Priority Data
Feb. 28, 2011 (JP) ................... 2011-041686

(51) Int. Cl.
*G02B 5/32* (2006.01)
*B29C 55/02* (2006.01)
(Continued)

(52) U.S. Cl.
CPC .............. *G02B 5/32* (2013.01); *B29C 55/023* (2013.01); *B29C 55/143* (2013.01);
(Continued)

(58) Field of Classification Search
CPC .. G02B 5/3008; G02B 5/3083; G02B 5/3091; G02B 5/32; B29C 55/023; B29C 55/143;
(Continued)

(56) References Cited

U.S. PATENT DOCUMENTS 8,203,676 B2 6/2012 Uchiyama et al.
2002/0005925 A1* 1/2002 Arakawa ................ 349/117
(Continued)

FOREIGN PATENT DOCUMENTS

CN 101509985 A 8/2009
JP 2008-216998 A 9/2008
(Continued)

OTHER PUBLICATIONS

Japanese Office Action and its English translation for JP2012-524810, dated Jul. 10, 2012.
(Continued)

*Primary Examiner* — William R Alexander
*Assistant Examiner* — Jeffrey Madonna
(74) *Attorney, Agent, or Firm* — Birch, Stewart, Kolasch & Birch, LLP

(57) ABSTRACT

Having a layer B formed of a resin "b" having a negative intrinsic birefringence value; and layers A formed of a resin "a" having a positive intrinsic birefringence value and formed on both surfaces of the layer B, wherein the resin "b" includes a styrene-based polymer, the resin "a" includes a polycarbonate, and a difference in average refractive index between the resin "b" and the resin "a" is 0.01 or more.

14 Claims, 3 Drawing Sheets

(51) Int. Cl.
- B29C 55/14 (2006.01)
- G02B 5/30 (2006.01)
- B32B 7/02 (2006.01)
- B32B 27/08 (2006.01)
- B32B 27/30 (2006.01)
- B32B 27/36 (2006.01)
- B29D 11/00 (2006.01)
- B29K 25/00 (2006.01)
- B29K 69/00 (2006.01)
- G02F 1/13363 (2006.01)

(52) U.S. Cl.
CPC .... B29D 11/0073 (2013.01); B29D 11/00951 (2013.01); B32B 7/02 (2013.01); B32B 27/08 (2013.01); B32B 27/302 (2013.01); B32B 27/365 (2013.01); G02B 5/3083 (2013.01); B29K 2025/04 (2013.01); B29K 2069/00 (2013.01); B32B 2457/202 (2013.01); G02F 1/13363 (2013.01); G02F 2413/02 (2013.01); G02F 2413/14 (2013.01)

(58) Field of Classification Search
CPC .......... B29D 11/0073; B29D 11/00951; B32B 27/08; B32B 27/302; B32B 27/365
USPC ............... 359/489.01–489.13, 577, 580–590
See application file for complete search history.

(56) References Cited

U.S. PATENT DOCUMENTS

| | | | |
|---|---|---|---|
| 2009/0207491 A1 | 8/2009 | Takebe et al. | |
| 2009/0214869 A1 | 8/2009 | Hatano et al. | |
| 2009/0220758 A1* | 9/2009 | Hatano | B29C 55/023 428/213 |
| 2009/0237790 A1* | 9/2009 | Hatano | G02B 5/3083 359/489.07 |
| 2009/0290103 A1* | 11/2009 | Itou | G02B 5/3033 349/96 |
| 2012/0188492 A1* | 7/2012 | Sakai | G02B 5/3016 349/102 |

FOREIGN PATENT DOCUMENTS

| | | |
|---|---|---|
| JP | 2009-192844 A | 8/2009 |
| JP | 2009-192845 A | 8/2009 |
| JP | 2009-223163 A | 10/2009 |
| WO | WO 2008/146924 A1 | 12/2008 |
| WO | WO 2009/001799 A1 | 12/2008 |
| WO | WO 2009/022883 A2 | 2/2009 |

OTHER PUBLICATIONS

Chinese Office Action issued in Chinese Application No. 201280010611.3 dated Feb. 2, 2015.

International Search Report Issued in PCT/JP2012/054137 dated Apr. 10, 2012.

PCT/ISA/237—dated Apr. 10, 2012, issued in PCT/JP2012/054137.

* cited by examiner

MULTILAYERED FILM AND METHOD OF MANUFACTURING MULTILAYERED FILM

FIELD

The present invention relates to a multilayer film and a method for manufacturing the same, and in particular, to an optical multilayer film and a method for manufacturing the same.

BACKGROUND

Phase difference films such as those used for optical compensation of liquid crystal display devices are required to have an ability to reduce the change of color tone of the display device depending on an observation angle, and thus a variety of techniques therefor have been developed in prior art. For example, Patent Literature 1 proposes a phase difference film in which a film formed of a resin having a positive intrinsic birefringence value and a film formed of a resin having a negative intrinsic birefringence value are attached to each other. However, the resin having a negative intrinsic birefringence value usually has low strength and is brittle. For this reason, when a layer formed of the resin having a negative intrinsic birefringence value is exposed on the surface of a phase difference film, the layer formed of the resin having a negative intrinsic birefringence value is easily broken in handling of the phase difference film.

Aiming at prevention of breakage of the layer formed of the resin having a negative intrinsic birefringence value, Patent Literature 2 proposes that a layer formed of the resin having a negative intrinsic birefringence value is interposed between a pair of layers formed of the resin having a positive intrinsic birefringence value. According to the structure described in Patent Literature 2, the pair of layers formed of the resin having a positive intrinsic birefringence value can protect the layer formed of the resin having a negative intrinsic birefringence value, whereby breakage of the layer formed of the resin having a negative intrinsic birefringence value can be prevented.

CITATION LIST

Patent Literature

Patent Literature 1: Japanese Patent Application Laid-Open No. 2008-216998 A
Patent Literature 2: Japanese Patent Application Laid-Open No. 2009-192845 A

SUMMARY

Technical Problem

When the layer formed of the resin having a negative intrinsic birefringence value is interposed between the pair of layers formed of the resin having a positive intrinsic birefringence value as described in Patent Literature 2, existence of a plurality of layers formed of the resin having a positive intrinsic birefringence value raises complexity of control of retardation (phase difference). Accordingly, in order to precisely control retardation of a phase difference film, it is required to precisely control the thickness of each layer of the phase difference film.

In order to precisely control the thickness of each layer of the phase difference film, it is preferable to accurately measure the thickness of each layer during manufacture and to properly set manufacturing conditions based on the measured thickness. However, as for the prior-art phase difference film described in Patent Literature 2, it was difficult to accurately measure the thickness of each layer during manufacture. After the manufacture, it is possible to perform thickness measurement by, e.g., observing a cross-section of the film under a scanning electron microscope (SEM). However, during in-line manufacture, accurate measurement of the thickness was difficult due to, e.g., vibration caused by conveyance. In particular, when a resin including a polycarbonate is used as the resin having a positive intrinsic birefringence value and a resin including a styrene-based polymer is used as the resin having a negative intrinsic birefringence value, the resins forming respective layers have the same level of refractive index and therefore it was particularly difficult to optically measure the thickness of each layer.

For example, when there are only one layer formed of the resin having a positive intrinsic birefringence value and only one layer formed of the resin having a negative intrinsic birefringence value as described in patent. Literature 1, it is possible to perform thickness measurement on the basis of absorption of infrared radiation in each layer using an infrared film thickness meter. However, when there are a plurality of layers formed of the resin having a positive intrinsic birefringence value as described in Patent Literature 2, an infrared thickness meter was not applicable to measure the thickness of each of the layers formed of the resin having a positive intrinsic birefringence value.

The present invention has been made in the view of the aforementioned problems. It is an object of the present invention to provide a multilayer film including a layer B formed of a resin "b" having a negative intrinsic birefringence value and layers A formed of a resin "a" having a positive intrinsic birefringence value and formed on both surfaces of the layer B, in which the resin "b" includes a styrene-based polymer and the resin "a" includes a polycarbonate, and the thickness of each of the layers A and the layer B can be measured. Further, it is another object of the present invention to provide a method for manufacturing such a multilayer film as a phase difference film having desired retardation.

Solution to Problem

As a result of intensive studies for solving the aforementioned problems, the present inventor has found out that enlargement of the difference in refractive index between the resin "a" and the resin "b" enables thickness measurement of each of the layers A and the layer B with an interference thickness meter utilizing reflection of light at the interface of the layer A and the layer B even during the manufacture of the multilayer film. The present inventor has further found out that, when the multilayer film is a phase difference film, the retardation of the multilayer film can be precisely controlled by performing feedback control according to the thickness of each of the layers A and the layer B measured during the manufacture and properly adjusting the manufacturing conditions. The present inventor has accomplished the present invention based on these findings.

That is, the present invention is as following (1) to (9).

(1) A multilayer film, comprising a layer B formed of a resin "b" having a negative intrinsic birefringence value; and layers A formed of a resin "a" having a positive intrinsic birefringence value and formed on both surfaces of the layer B, wherein:

the resin "b" includes a styrene-based polymer, the resin "a" includes a polycarbonate, and a difference in average refractive index between the resin "b" and the resin "a" is 0.01 or more.

(2) The multilayer film according to (1), wherein the resin "a" or the resin "b" includes a polymer containing a repeating unit derived from an acrylic compound.

(3) The multilayer film according to (2), wherein an amount of the repeating unit derived from the acrylic compound in the polymer included in the resin "a" or the resin "b" is 5% by weight or more and 35% by weight or less.

(4) The multilayer film according to any one of (1) to (3), wherein the styrene-based polymer is a copolymer containing a repeating unit derived from maleic anhydride.

(5) The multilayer film according to any one of (1) to (4), wherein the multilayer film is formed by a co-extrusion method.

(6) The multilayer film according to any one of (1) to (5), wherein the multilayer film is a phase difference film whose retardation Re at an incident angle of 0° and retardation $R_{40}$ at an incident angle of 40° satisfy a relationship of $0.92 \leq R_{40}/Re \leq 1.08$.

(7) A method for manufacturing the multilayer film according to (6), comprising:

a co-extrusion step of co-extruding a resin "b" having a negative intrinsic birefringence value and a resin "a" having a positive intrinsic birefringence value to obtain a pre-stretch film, wherein the pre-stretch film causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;

a first stretching step of subjecting the pre-stretch film to a uniaxial stretching treatment in one direction at either the temperature T1 or T2; and a second stretching step of performing a uniaxial stretching treatment in a direction orthogonal to the direction for the uniaxial stretching treatment performed in the first stretching step at the different one of the temperatures T2 and T1, wherein:

the resin "b" includes a styrene-based polymer;

the resin "a" includes a polycarbonate; and a difference in average refractive index between the resin "b" and the resin "a" is 0.01 or more.

(8) The manufacturing method according to (7), wherein:

in the co-extrusion step, the pre-stretch film is obtained by co-extruding the resin "a" and the resin "b" from a size-adjustable opening of a die, and the manufacturing method comprises: a measuring step of measuring a thickness of each of a layer formed of the resin "a" of the pre-stretch film and a layer formed of the resin "b" with an interference thickness meter; and an opening adjustment step of adjusting the size of the opening of the die in accordance with the measured thickness of each layer.

(9) The manufacturing method according to (8), comprising a rate adjustment step of adjusting an extrusion rate of one or both of the resin "a" and the resin "b" in accordance with the measured thickness of each layer.

Advantageous Effects of Invention

According to the multilayer film of the present invention, the thickness of each of the layers A and the layer B can be accurately measured even during, e.g., manufacturing process of the multilayer film.

According to the method for manufacturing the multilayer film of the present invention, the multilayer film of the present invention can be manufactured as a phase difference film having desired retardation.

BRIEF DESCRIPTION OF DRAWINGS

FIG. 2 shows an instance wherein it is assumed that a glass transition temperature $Tg_A$ of the resin "a" forming the layers A is higher and a glass transition temperature $Tg_B$ of the resin "b" forming the layer B is lower.

DESCRIPTION OF EMBODIMENTS

Figure 1:
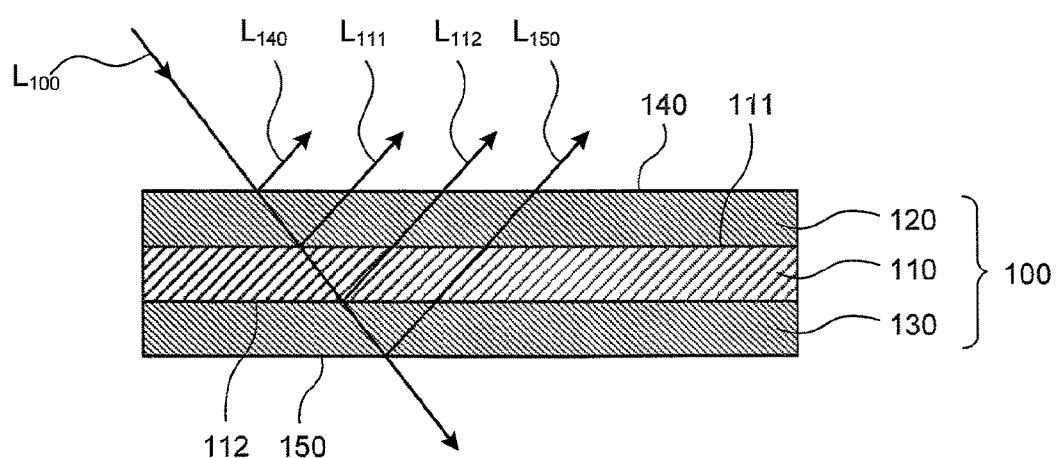
FIG. 1 is a cross-sectional view schematically showing a cross section of an example of a multilayer film of the present invention when the film is cut along a plane perpendicular to the main surface of the film.

The present invention will be described hereinbelow in detail by way of embodiments and exemplifications, but the present invention is not limited to the following embodiments and exemplifications and may be implemented with arbitrary modification without departing from the scope of claims and equivalents thereto.

[1. Multilayer Film]

The multilayer film of the present invention includes: a layer B formed of a resin "b" having a negative intrinsic birefringence value; and layers A formed of a resin "a" having a positive intrinsic birefringence value and formed on both surfaces of the layer B. That is, the multilayer film of the present invention includes the layer A, the layer B, and the layer A in this order.

As used herein, the positive intrinsic birefringence value means that the refractive index in the stretched direction is larger than the refractive index in the direction orthogonal to the stretched direction. On the other hand, the negative intrinsic birefringence value means that the refractive index in the stretched direction is smaller than the refractive index in the direction orthogonal to the stretched direction. The intrinsic birefringence value may also be calculated from the permittivity distribution.

[1-1. Layer B]

The layer B is formed of the resin "b" having a negative intrinsic birefringence value. The resin "b" having a negative intrinsic birefringence value includes at least a styrene-based polymer. As the styrene-based polymer, one species thereof may be solely used, or two or more species thereof may be used in combination at any ratio.

The styrene-based polymer is a polymer containing a repeating unit derived from a styrene-based monomer (appropriately referred to hereinbelow as a "styrene-based monomer unit"). The styrene-based monomers means any of styrene and styrene derivatives. Examples of the styrene derivatives may include α-methylstyrene, o-methylstyrene, p-methylstyrene, p-chlorostyrene, p-nitrostyrene, p-aminostyrene, p-carboxystyrene, and p-phenylstyrene. As the styrene-based monomer, one species thereof may be solely used, or two or more species thereof may be used in combination at any ratio. Therefore, the styrene-based polymer may solely contain one species of the styrene-based monomer unit, or may contain two or more species of the styrene-based monomer units in combination at any ratio.

The styrene-based polymer may be a homopolymer or a copolymer containing only the styrene-based monomer, or may be a copolymer of the styrene-based monomer and another monomer. Examples of the monomer to be copolymerized with the styrene-based monomer may include ethylene, propylene, butadiene, isoprene, acrylonitrile, methacrylonitrile, a-chloroacrylonitrile, N-phenylmaleimide, methyl acrylate, methyl methacrylate, ethyl acrylate, ethyl methacrylate, maleic anhydride, acrylic acid, methacrylic acid, and vinyl acetate. As these monomers, one species thereof may be solely used, or two or more species thereof may be used in combination at any ratio.

Among these, when the styrene-based polymer is a copolymer, the styrene-based polymer is preferably a copolymer containing a repeating unit derived from a maleic anhydride (appropriately referred to hereinbelow as a "maleic anhydride unit"). When the styrene-based polymer is a copolymer including the maleic anhydride unit, the thermal resistance of the styrene-based polymer can be improved. The amount of the maleic anhydride unit is preferably 5 parts by weight or more, more preferably 10 parts by weight or more, and particularly preferably 15 parts by weight or more, and preferably 30 parts by weight or less, more preferably 28 parts by weight or less, and particularly preferably 26 parts by weight or less, with respect to 100 parts by weight of the styrene-based polymer.

Moreover, the resin "b" having a negative intrinsic birefringence value preferably includes a polymer containing a repeating unit derived from an acrylic compound (appropriately referred to hereinbelow as an "acrylic polymer"). The acrylic polymer may be a polymer different from the styrene-based polymer. Alternatively, the styrene-based polymer itself may be an acrylic polymer as well by forming a styrene-based polymer as a copolymer that also includes a repeating unit derived from an acrylic compound. Accordingly, the difference in average refractive index between the resin "b" and the resin "a" can be adjusted. Since the acrylic compound has high affinity to the polycarbonate, inclusion of the acrylic polymer in the resin "b" having a negative intrinsic birefringence value can improve the adhesiveness between the layer A and the layer B. In addition, since the acrylic polymer has high strength and hardness, it can increase the strength of the layer B and thus increase the strength of the multilayer film of the present invention.

The acrylic compound means any of acrylic acid and acrylic acid derivatives. Examples of the acrylic compound may include acrylic acid, acrylic acid esters, acrylamide, acrylonitrile, methacrylic acid, and methacrylic acid esters. Among these, acrylic acid derivatives are more preferable and (meth)acrylic acid ester is more preferable as the acrylic compound. As used herein, "(meth)acryl-" means acryl- and methacryl-.

Examples of (meth)acrylic acid ester may include alkyl ester of (meth)acrylic acid. Especially, one having a structure derived from (meth)acrylic acid and alkanol or cycloalkanol with 1 to 15 carbon atoms is preferable, and one having a structure derived from alkanol with 1 to 8 carbon atoms is more preferable. By employing compounds having such a small numbers of carbon atoms, elongation at breakage of the multilayer film of the present invention can be reduced.

Specific examples of acrylic acid ester may include methyl acrylate, ethyl acrylate, n-propyl acrylate, i-propyl acrylate, n-butyl acrylate, i-butyl acrylate, sec-butyl acrylate, t-butyl acrylate, n-hexyl acrylate, cyclohexyl acrylate, n-octyl acrylate, 2-ethylhexy-acrylate, n-decyl acrylate, and n-dodecyl acrylate.

Specific examples of methacrylic acid ester may include methyl methacrylate, ethyl methacrylate, n-propyl methacrylate, i-propyl methacrylate, n-butyl methacrylate, i-butyl methacrylate, sec-butyl methacrylate, t-butyl methacrylate, n-hexyl methacrylate, n-octyl methacrylate, 2-ethylhexyl methacrylate, n-decyl methacrylate, and n-dodecyl methacrylate.

Further, the (meth)acrylic acid ester may have such a substituent as a hydroxyl group and a halogen atom within the range where the effects of the present invention are significantly impaired. Examples of the (meth)acrylic acid ester having such a substituent may include 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, 3-chloro-2-hydroxypropyl methacrylate, and glycidyl methacrylate.

As the acrylic compound, one species thereof may be solely used, or two or more species thereof may be used in combination at any ratio.

The acrylic polymer may be a polymer of only the acrylic compound, or may be a copolymer of the acrylic compound and a monomer copolymerizable therewith. Examples of the copolymerizable monomer may include α,β-ethylenically unsaturated carboxylic acid ester monomer other than the aforementioned (meth)acrylic acid esters, and α,β-ethylenically unsaturated carboxylic acid monomer, an alkenyl aromatic monomer, a conjugated diene monomer, a nonconjugated diene monomer, carboxylic acid unsaturated alcohol ester, and an olefin monomer. When the styrene-based polymer is also the acrylic polymer as described above, the styrene-based monomer is copolymerized with the acrylic compound. As the monomer copolymerizable with the acrylic compound, one species thereof may be solely used, or two or more species thereof may be used in combination at any ratio.

When the resin "b" includes the acrylic polymer, the amount of the repeating units derived from the acrylic compound in the polymer included in the resin "b" is preferably 5% by weight or more, more preferably 10% by weight or more, and particularly preferably 15% by weight or more, and preferably 35% by weight or less, more preferably 30% by weight or less, and particularly preferably 25% by weight or less, with respect to 100% by weight of the total amount of all polymers included in the resin "b". By setting the amount of the repeating units derived from the acrylic compound equal to or more than the lower limit of the aforementioned range, the adhesiveness between the layer A and the layer B can be stably increased, and by setting it equal to or less than the upper limit, the thermal resistance of the resin "b" can be increased and the durability at stretching can be kept at a high level.

The acrylic polymer may be included in the resin "a". Accordingly, the acrylic polymer may be included in either the resin "a" or the resin "b", or may be included in both of them. However, in view of imparting a refractive index difference between the layer A and the layer B, the acrylic polymer is preferably included in either one of the resin "a" and the resin "b". Particularly, when the styrene-based polymer includes a maleic anhydride unit, it is preferable that the acrylic polymer is included in the resin "b" in view of effectively taking advantage of specific compatibility of the acrylic polymer that is easily mixed with the styrene-based polymer. In addition, as the thermal resistance of the styrene-based polymer can be improved when the styrene-based polymer includes a maleic anhydride unit, it is preferable to combine the maleic anhydride unit and the acrylic polymer in the resin "b" since thereby adhesiveness between the layer A and the layer B can be improved while decrease in the heat-resistance due to the acrylic polymer can be suppressed.

The resin "b" having a negative intrinsic birefringence value may include a component other than the styrene-based polymer and the acrylic polymer unless the effects of the present invention are significantly impaired. For example, the resin "b" having a negative intrinsic birefringence value may include a polymer other than the styrene-based polymer and the acrylic polymer, and an additive.

In view of setting the intrinsic birefringence value of the resin "b" to a negative value, the polymer other than the styrene-based polymer and the acrylic polymer is preferably a polymer having a negative intrinsic birefringence value. Specific examples thereof may include cellulose ester polymers and their multi-component copolymers. The constituent of these polymers may be contained as a part of the repeating units of the styrene-based polymer or the acrylic polymer. Moreover, one species of them may be solely used, or two or more species thereof may be used in combination at any ratio. However, in view of remarkably exerting the advantage of the present invention, the amount of the polymer other than the styrene-based polymer and the acrylic polymer in the resin "b" is preferably small, e.g., preferably 10 parts by weight or less, more preferably 5 parts by weight or less, and still more preferably 3 parts by weight or less, with respect to 100 parts by weight of the styrene-based polymer. Particularly, it is especially preferable that the polymer other than the styrene-based polymer and the acrylic polymer is not included.

Examples of the additive may include antifriction agents; lamellar crystal compounds; inorganic particulates; stabilizers such as antioxidants, thermal stabilizers, light stabilizers, weathering stabilizers, ultraviolet absorbers, and near infrared absorbers; plasticizers; coloring agents such as dyes and pigments; and antistatic agents. Among these, the antifriction agent and the ultraviolet absorbers are preferable since they can respectively improve flexibility and weather resistance of the layer B. As the additive, one species thereof may be solely used, or two or more species thereof may be used in combination at any ratio. The amount of the additive may be appropriately set within the range where the effects of the invention are significantly impaired and may be, e.g., within the range where the total light transmittance in terms of 1 mm thickness of the multilayer film of the present invention can be kept at 80% or higher.

Examples of the antifriction agent may include inorganic particles of, such as silicon dioxide, titanium dioxide, magnesium oxide, calcium carbonate, magnesium carbonate, barium sulfate, and strontium sulfate; and organic particles of, such as polymethyl acrylate, polymethyl methacrylate, polyacrylonitrile, polystyrene, cellulose acetate, and cellulose acetate propionate. Among these, the organic particles are preferable as an antifriction agent.

Examples of the ultraviolet absorber may include oxybenzophenone-based compounds, benzotriazol-based compounds, salicylate-based compounds, benzophenone-based ultraviolet absorbers, benzotriazol-based ultraviolet absorbers, acrylonitrile-based ultraviolet absorbers, triazine-based compounds, nickel complex salt-based compounds, and inorganic powders. Specific examples of the suitable ultraviolet absorbers may include 2,2'-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly, 2,2'-methylenebis(4-(1,1,3,3-tetramethylbutyl)-6-(2H-benzotriazol-2-yl)phenol) is preferable.

The glass transition temperature $Tg_B$ of the resin "b" having a negative intrinsic birefringence value is usually 80° C. or higher, preferably 90° C. or higher, more preferably 100° C. or higher, still more preferably 110° C. or higher, and particularly preferably 120° C. or higher. Such high glass transition temperature $Tg_B$ can reduce orientation relaxation of the resin "b" having a negative intrinsic birefringence value. The upper limit of the glass transition temperature $Tg_B$ is not particularly limited, but usually 200° C. or lower.

The fracture elongation of the resin "b" having a negative intrinsic birefringence value at the glass transition temperature $Tg_A$ of the resin "a" having a positive intrinsic birefringence value is preferably 50% or more and more preferably 80% or more. The upper limit of the fracture elongation of the resin "b" having a negative intrinsic birefringence value is not particularly limited, but usually 200% or less. When the fracture elongation is within this range, the multilayer film of the present invention can be stably produced by stretching. The fracture elongation is determined using a type 1B test piece described in JIS K7127 at a tensile speed of 100 mm/min.

The absolute value $|Tg_A-Tg_B|$ of the difference between the glass transition temperature $Tg_A$ of the resin "a" having a positive intrinsic birefringence value and the glass transition temperature $Tg_B$ of the resin "b" having a negative intrinsic birefringence value is preferably more than 5° C. and more preferably 8° C. or more, and preferably 40° C. or less and more preferably 20° C. or less. When the absolute value $|Tg_A-Tg_B|$ of the difference between the aforementioned glass transition temperatures is too small, the temperature dependence of retardation expression tends to be decreased. On the other hand, when the absolute value $|Tg_A-Tg_B|$ of the difference between the aforementioned glass transition temperatures is too large, stretching of the resin having high glass transition temperature becomes difficult, the multilayer film tends to lose flatness. In addition, the aforementioned glass transition temperature $Tg_A$ is preferably higher than the glass transition temperature $Tg_B$. Therefore, it is usually preferable that the resin having a positive intrinsic birefringence value and the resin "b" having a negative intrinsic birefringence value satisfy the relationship of $Tg_A>Tg_B+5°$ C.

In the multilayer film of the present invention, the layer B is interposed between the layers A. Therefore, even when the resin "b" has poor strength, the layer B formed of the resin "b" does not cause breakage.

When the multilayer film of the present invention is used as a phase difference film, the polymer molecules included in the resin "b" having a negative intrinsic birefringence value in the layer B are usually oriented, e.g., by stretching. The orientation of the polymer molecules produces refractive index anisotropy to express retardation in the layer B. In the multilayer film of the present invention, the retardation thus expressed in the layer B is combined with the retardation expressed in the layers A to generate desired retardation as the entire multilayer film of the present invention. Therefore, the thickness of the layer B may be set to a suitable value in accordance with the specific retardation that is desired to be expressed in the multilayer film of the present invention.

Although the multilayer film of the present invention may include two or more layers B, the multilayer film preferably includes only one layer B in view of facilitating control of the retardation and reducing thickness of the multilayer film of the present invention.

[1-2. Layer A]

The layers A are formed of the resin "a" having a positive intrinsic birefringence value. The resin "a" having a positive intrinsic birefringence value includes at least a polycarbonate. The polycarbonate is a polymer excellent in expression of the retardation, stretching properties at low temperatures, and adhesiveness to other layers.

As the polycarbonate, any polycarbonate may be used as long as it is a polymer having repeating units via a carbonate bonding (—O—C(=O)—O—). As the polycarbonate, those formed of one species of the repeating unit may be used, and those formed of two or more species of the repeating units in combination at any ratio may also be used.

Examples of the polycarbonate may include bisphenol A polycarbonate, branched bisphenol A polycarbonate, and o,o,o',o'-tetramethyl bisphenol A polycarbonate.

As the polycarbonate, one species thereof may be solely used, or two or more species thereof may be used in combination at any ratio.

In the same manner as with the resin "b", the resin "a" having a positive intrinsic birefringence value may include the acrylic polymer. When the resin "a" having a positive intrinsic birefringence value includes the acrylic polymer, difference in average refractive index between the resin "b" and the resin "a" can be adjusted.

When the resin "a" includes the acrylic polymer, the amount of the repeating units derived from the acrylic compound in the resin "a" may be made the same as the amount of the repeating units derived from the acrylic compound in the resin "b". Specifically, the amount of the repeating units derived from the acrylic compound in the polymer included in the resin "a" is preferably 5% by weight or more, more preferably 10% by weight or more, and particularly preferably 15% by weight or more, and preferably 35% by weight or less, more preferably 30% by weight or less, and particularly preferably 25% by weight or less, with respect to 100% by weight of the total amount of all polymers included in the resin "a". By setting the amount of the repeating units derived from the acrylic compound equal to or more than the lower limit of the aforementioned range, the difference in average refractive index between the resin "a" and the resin "b" can be properly adjusted, and by setting it equal to or less than the upper limit, the thermal resistance of the resin "a" can be increased so that the durability at stretching can be kept at a high level.

The resin "a" having a positive intrinsic birefringence value may include a component other than the polycarbonate and the acrylic polymer unless the effects of the present invention are significantly impaired. For example, the resin "a" having a positive intrinsic birefringence value may include a polymer other than the polycarbonate and the acrylic polymer, and an additive.

Examples of the polymer other than the polycarbonate and the acrylic polymer which may be included in the resin "a" having a positive intrinsic birefringence value may include olefin polymers such as polyethylene and polypropylene; polyesters such as polyethylene terephthalate and polybutylene terephthalate; polyarylene sulfides such as polyphenylene sulfide; polyvinyl alcohol; cellulose ester; polyether sulphona; polysulfone; polyarylsulfone; polyvinyl chloride; norbornene polymer; and rod-shaped liquid crystal polymer. The constituent of these polymers may be contained as a part of the repeating units of the polycarbonate or the acrylic polymer. Moreover, one species of them may be solely used, or two or more species thereof may be used in combination at any ratio. However, in view of remarkably exerting the advantage of the present invention, the amount of the polymer other than the polycarbonate and the acrylic polymer in the resin "a" is preferably small, e.g., preferably 10 parts by weight or less, more preferably 5 parts by weight or less, and still more preferably 3 parts by weight or less, with respect to 100 parts by weight of the polycarbonate. Particularly, it is especially preferable that the polymer other than the polycarbonate and the acrylic polymer is not included.

Examples of the additive which may be included in the resin "a" having a positive intrinsic birefringence value may include the same examples as the additive which may be included in the resin "b" having a negative intrinsic birefringence value. As the additive, one species thereof may be solely used, or two or more species thereof may be used in combination at any ratio. The amount of the additive may be appropriately set within the range where the effects of the invention are significantly impaired and may be, e.g., within the range where the total light transmittance in terms of 1 mm thickness of the multilayer film can be kept at 80% or higher.

The glass transition temperature $Tg_A$ of the resin "a" having a positive intrinsic birefringence value is usually 80° C. or higher, preferably 90° C. or higher, more preferably 100° C. or higher, still more preferably 110° C. or higher, and particularly preferably 120° C. or higher. Such high glass transition temperature $Tg_A$ can reduce orientation relaxation of the resin "a" having a positive intrinsic birefringence value. The upper limit of the glass transition temperature $Tg_A$ is not particularly limited, but usually 200° C. or lower.

The fracture elongation of the resin "a" having a positive intrinsic birefringence value at the glass transition temperature $Tg_B$ of the resin "b" having a negative intrinsic birefringence value is preferably 50% or more, and more preferably 80% or more. When the fracture elongation is within this range, the phase difference film can be stably produced by stretching. The upper limit of the fracture elongation of the resin "a" having a positive intrinsic birefringence value is not particularly limited, but usually 150% or less.

Usually, the layers A are provided in an exposed manner on the main surfaces of the multilayer film of the present invention. That is, the layers A are usually the outermost layers of the multilayer film of the present invention. Even though the layers A are exposed in this manner, usually the layers do not easily broken in handling and they do not reduce handleability because of high strength of the layers A.

When the multilayer film of the present invention is used as a phase difference film, the polymer molecules included in the resin "a" having a positive intrinsic birefringence value in the layers A are usually oriented, e.g., by stretching. The orientation of the polymer molecules produces refractive index anisotropy to express retardation in the layers A. In the multilayer film of the present invention, the retardation thus expressed in the layers A is combined with the retardation expressed in the layer B to generate desired retardation as the entire multilayer film of the present invention. Therefore, the thickness of the layers A may be set to a suitable value in accordance with the specific retardation that is desired to be expressed in the multilayer film of the present invention.

Although the multilayer film of the present invention may include three or more layers A, the multilayer film preferably includes only two layers A in view of facilitating control of the retardation and reducing thickness of the multilayer film of the present invention.

[1-3. Difference in Average Refractive Index Between Resin "b" and Resin "a", and Measurement of Thickness]

For the multilayer film of the present invention, the difference in average refractive index between the resin "b" and the resin "a" is usually 0.01 or more. Having such difference, thickness measurement of each of the layers A and the layer B in the multilayer film of the present invention can be performed using an interference thickness meter. Especially, the difference in average refractive index between the resin "b" and the resin "a" is preferably 0.02 or more in view of stable, accurate measurement of the thickness of each of the layers A and the layer B.

FIG. 1 is a cross-sectional view schematically showing a cross section of an example of a multilayer film of the present invention when the film is cut along a plane perpendicular to the main surface of the film. As shown in FIG. 1, a multilayer film 100 include: a layer B 110 formed of the resin "b"; and layers A 120 and 130 formed of the resin "a" and formed on both surfaces 111 and 112 of the layer B 110. The layer B 110 and the layers A 120 and 130 are in direct contact with each other without any intervening layers such as adhesion layers. Therefore, between the layer B 110 and the layers A 120 and 130, there exist interfaces of the resin "b" and the resin "a". In this example, since these interfaces correspond to the surfaces 111 and 112 of the layer B 110, these interfaces are denoted by the same reference numerals "111" and "112" as the surfaces 111 and 112 of the layer B 110. Since there is a large difference in average refractive index between the resin "b" and the resin "a" in the multilayer film 100, the interfaces 111 and 112 reflect light. Therefore, light $L_{100}$ with which the multilayer film 100 is irradiated is reflected on one main surface 140 of the multilayer film 100, the interface 111, the interface 112, and the other main surface 150 of the multilayer film 100, as indicated by arrows $L_{140}$, $L_{111}$, $L_{112}$, and $L_{150}$, respectively. The interference thickness meter detects lights $L_{140}$, $L_{111}$, $L_{112}$, and $L_{150}$ reflected in such manners to measure the thickness of the layer B 110 and the layers A 120 and 130.

Considering the fact that an optical film has generally been developed aiming at minimizing the refractive index difference between resins included in the optical film, it is of great significance to intentionally provide a difference in average refractive index between the resin "a" forming the layers A and the resin "b" forming the layer B as in the present invention. There is usually no trend that a larger difference in average refractive index results in better measurement accuracy, and the thickness of each of the layers A and the layer B can be easily measured with sufficient accuracy as long as the difference in average refractive index is set within the aforementioned range. Accordingly, the upper limit of the difference in average refractive index between the resin "b" and the resin "a" is not particularly limited, but usually 0.15 or less, and preferably 0.10 or less.

The aforementioned average refractive index means the average value of the refractive index of the measured resin in all measurement directions. Accordingly, when the molecules in the resin are not oriented such as when the multilayer film is not stretched, the refractive index of the resin is usually uniform regardless of the measurement direction. Thus, in this case, in whatever direction the refractive index is measured, the value of the refractive index itself may be employed as an average refractive index. When the molecules in the resin are oriented such as when the multilayer film is stretched, the refractive index of the resin may vary depending on the measurement direction. Thus, the refractive indices are measured in all measurement directions to obtain the average of the measured value as the average refractive index. However, the average refractive index of the resin which is oriented in the multilayer film may usually be obtained as the average value of the refractive index in an advanced phase axis in the plane of the multilayer film, the refractive index in a retarded phase axis in the plane of the multilayer film, and the refractive index in a thickness direction.

The wavelength for measuring the average refractive index of the resin "b" and the resin "a" is usually set to 532 nm.

In order to set the difference in average refractive index between the resin "b" and the resin "a" within the aforementioned range, the refractive index of each of the resin "b" and the resin "a" may be adjusted. There is no limitation in the procedure for adjusting the refractive index of each of the resin "b" and the resin "a". Examples of the procedure may include addition of a polymer or a monomer unit having a refractive index different from that of the styrene-based polymer or the polycarbonate, and addition of an additive, to the resin "b" and the resin "a". Specifically, when the resin "b" includes the acrylic polymer, the ratio of the styrene-based polymer and the acrylic polymer may be adjusted, or a repeating unit derived from the acrylic compound may be added to the styrene-based polymer, whereby the refractive index of the resin "b" can be modified, and the difference in average refractive index between the resin "b" and the resin "a" can be adjusted within the aforementioned range.

[1-4. Other Layers]

The multilayer film of the present invention may include other layers than the layers A and the layer B unless the effects of the present invention are significantly impaired.

For example, the multilayer film of the present invention may have, on the surface thereof, a mat layer for improving slipping properties of the film, a hard-coat layer for preventing scratch on the surface of the film, an antireflection layer for suppressing reflection of light on the surface of the film, and an antifouling layer for preventing adhesion of stains.

[1-5. Physical Properties, Etc. Of Multilayer Film]

It is preferable that the multilayer film of the present invention has a total light transmittance of 85% or more in view of stably functioning as an optical member. The light transmittance may be measured using a spectrophotometer (produced by Jasco Corporation, ultraviolet visible near-infrared spectrophotometer "V-570") in accordance with JIS K0115. Further, the upper limit of the total light transmittance is ideally 100%.

The multilayer film of the present invention has a haze of preferably 5% or less, more preferably 3% or less, and particularly preferably 1% or less. The multilayer film of the present invention having such a low haze can improve the clarity of a display image of a display device when the film is incorporated into the device. The haze herein is the value obtained by measuring haze at five locations using a "Haze meter IDH-300A" manufactured by Nippon Denshoku Industries Co., Ltd. in accordance with JIS K7361-1997, and calculating an average value therefrom. The lower limit of the aforementioned haze is ideally 0%.

The multilayer film of the present invention has ΔYI of preferably 5 or less, and more preferably 3 or less. When this ΔYI is within the aforementioned range, good Visibility without coloring can be achieved. The ΔYI is measured using a "spectrophotometer SE 2000" produced by Nippon Denshoku Industries Co., Ltd. in accordance with ASTM E313. The same measurement is repeated 5 times, and the arithmetic average of the measured values is calculated. The lower limit of the aforementioned ΔYI is ideally zero.

When the multilayer film of the present invention is a phase difference film, the multilayer film of the present invention preferably has desired retardation in accordance with its application as a phase difference film. For example, when it is used as a phase difference film for liquid crystal display devices, it is preferable that retardation Re at an incident angle of 0° and retardation $R_{40}$ at an incident angle of 40° satisfy the relationship of $0.92 \leq R_{40}/Re \leq 1.08$ in the multilayer film of the present invention. Especially, $R_{40}/Re$ is preferably 0.95 or more and preferably 1.05 or less. When the multilayer film of the present invention having such a relationship of Re and $R_{40}$ is applied to a display device such as a liquid crystal display device, the multilayer film can particularly preferably reduce the angular dependence of color tone of the display of the device.

The incident angle of 0° is the normal direction of the main surface of the muitilayer film, and the incident angle of 40° is an angle that is inclined by 40° from the normal direction of the main surface of the multilayer film. For measurement of $R_{40}$, the direction to which the observation angle is inclined is not particularly limited, and it is preferable that the value of $R_{40}$ satisfies this requirement when the observation angle is inclined to at least one direction.

The wavelength for measuring the retardations Re and $R_{40}$ may be any wavelength within the visible ray region, but it is preferably 590 nm.

The aforementioned retardation Re and $R_{40}$ at the incident angles of 0° and 40° may be measured by the parallel Nicol rotation method using COBRA-WR produced by Oji Scientific Instruments. When Re and $R_{40}$ satisfy the aforementioned relationship, refractive indices nx and ny in the directions of in-plane principal axes and refractive index nz in the thickness direction of the multilayer film usually satisfy nx>nz>ny. In this case, the refractive indices nx, nz, and ny are weighted averages $n_{ave}$ of the refractive indices in each direction in the layers included in the multilayer film of the present invention, and determined by the following formula, in which the refractive index of the resin of a layer "i" is denoted as ni and the thickness of the layer "i" is denoted as Li.

$$n_{ave}=\Sigma(ni \times Li)/\Sigma Li$$

When the multilayer film of the present invention is a phase difference film, the retardation Re at an incident angle of 0° in the multilayer film of the present invention is preferably 50 nm or more, and more preferably 100 nm or more, and preferably 400 nm or less, and more preferably 350 nm or less.

It is preferable that the outer surface of the multilayer film of the present invention is preferably flat with substantially no irregularly formed linear concave and linear convex portions extending in the MD direction (machine direction; it is a flow direction of the film in a manufacturing line, and usually the same as the lengthwise direction of a long-length film. This direction is also referred to as a longitudinal direction) (so-called die lines). The phrase "flat with substantially no irregularly formed linear concave and linear convex portions extending in the MD direction" herein means that, even if linear concave portions and linear convex portions are formed, the linear concave portions have a depth of smaller than 50 nm or a width of larger than 500 nm, and the linear convex portions have a height of smaller than 50 nm or a width of larger than 500 nm. More preferably, the linear concave portions have a depth of smaller than 30 nm or a width of larger than 700 nm, and the linear convex portions have a height of smaller than 30 nm or a width of larger than 700 nm. By having such a structure, occurrence of interference of light and light leakage due to refraction of light at the linear concave portions or the linear convex portions can be prevented, so that optical performance can be improved. The phrase "irregularly formed" means that linear concave and convex portions are formed with unintended sizes, unintended shapes, etc. at unintended positions.

The depth of the aforementioned linear concave portions, the height of the aforementioned linear convex portions, and the widths of these portions may be determined by the following method. The multilayer film is irradiated with light, and the transmitted light is projected onto a screen. Then a portion that produces bright or dark stripes on the screen is cut out with a size of 30-mm square (this portion is a portion having deep linear concave portions or high linear convex portions). The surface of the cut-out film piece is observed under a three-dimensional surface structure analysis microscope (viewing area: 5 mm×7 mm). The observed image is converted into a three-dimensional image, and cross-sectional profiles of the three-dimensional image are determined. The cross-sectional profiles are determined at 1 mm intervals in the viewing area.

A mean line is drawn in each cross sectional profile. The length from the mean line to the bottom of a linear concave portion is taken as the depth of the linear concave portion, and the length from the mean line to the apex of a linear convex portion is taken as the height of the linear convex portion. The distance between intersections of the mean line and the profile is taken as the width. Each of the maximum depth value of the linear concave portions and maximum height value of the linear convex portions is determined from the measured values thereof, and the width of each of the linear concave portion and linear convex portion showing the maximum values is determined. The determined maximum depth value of the linear concave portions and the maximum height value of the linear convex portions and the determined widths of the linear concave portion and linear convex portion showing the maximum values are taken as the depth of the linear concave portions in the film, the height of the linear convex portions, and their widths.

The multilayer film of the present invention may shrink as a result of heat treatment at 60° C. and 90% RH for 100 hours in the MD direction and the TD direction (traverse direction; the direction parallel to the film plane and orthogonal to the MD direction. This direction usually the same as the width direction. This direction is also referred to as a crosswise direction). However, the shrinkage ratio is preferably 0.5% or less, and more preferably 0.3% or less. By having such a small shrinkage ratio, the multilayer film of the present invention can be prevented from being deformed due to the shrinkage stress even in a high-temperature high-humidity environment, and therefore the multilayer film can be prevented from peeled off the display device.

The size of the multilayer film of the present invention in its TD direction may be, e.g., 1000 to 2000 mm. Although the multilayer film of the present invention has no size limitation in the MD direction, it is preferable that the Multilayer film is a long-length film. The "long-length" film herein means a film having a length equal to or greater than at least five times its width, and preferably having a length equal to or greater than ten times its width. Specifically the "long-length" film means a film having a length such that the film is capable of being wound up into a roll shape for storage and transportation.

The specific thickness of the multilayer film of the present invention may be set in accordance with the film strength required depending on the application, the degree of retardation to be expressed, and the like, and the thickness is preferably 10 μm or more and more preferably 30 μm or more, and preferably 200 μm or less and more preferably 150 μm or less.

[2. Method for Manufacturing Multilayer Film]

[2-1. Co-Extrusion Method]

The method for manufacturing the multilayer film of the present invention is not limited, and the multilayer film of the present invention may be manufactured by such methods as, e.g., co-extrusion methods such as a co-extrusion T-die method, a co-extrusion inflation method, and a co-extrusion lamination method; film lamination molding methods such as dry lamination; a co-casting method; and a coating forming method in which the surface of a resin film is coated with a resin solution. Among them, the co-extrusion method is preferable in terms of manufacturing efficiency and in view of eliminating residual volatile components such as a solvent in the film.

When the co-extrusion method is employed, the multilayer film may be obtained by, e.g., co-extruding the resin "a" having a positive intrinsic birefringence value and the resin "b" having a negative intrinsic birefringence value. Examples of the co-extrusion method may include a co-extrusion T-die method, a co-extrusion inflation method, and a co-extrusion lamination method. Among these, the co-extrusion T-die method is preferable. The co-extrusion T-die method may be of a feed block system and a multi-manifold system. The multi-manifold system is particularly preferable because of its ability to reduce variation in thickness.

When the co-extrusion T-die method is employed, the temperature for melting the resins in the extruder having a T die is set to a temperature higher than the glass transition temperatures of the resin "a" and the resin "b" preferably by 80° C. or more, and more preferably by 100° C. or more, and preferably by 180° C. or less and more preferably 150° C. or less. Excessively low melting temperature in the extruder may cause insufficient fluidity of the resin, whereas excessively high melting temperature may result in deterioration of the resin.

In the co-extrusion method, film-shaped molten resins extruded from the openings of the die are brought into tight contact with a cooling roll (this is also referred to as a cooling drum). No particular limitation is imposed on the method for bringing the molten resins into tight contact to the cooling roll. Examples of the method may include an air knife method, a vacuum box method, and an electrostatic contacting method.

No particular limitation is imposed on the number of cooling rolls. Usually, the number of cooling rolls is two or more. No particular limitation is imposed on the arrangement of the cooling rolls, and the arrangement may be of linear type, Z type, and L type. No particular limitation is imposed also on the manner of passing the molten resins extruded from the openings of the dies between the cooling rolls.

The contacting degree of the extruded film-shaped resins to the cooling rolls varies depending on the temperature of the cooling rolls. The contacting becomes tight by increasing the temperature of the cooling rolls. However, excessively higher temperature may cause a problem such that the film-shaped resin is not released from the cooling rolls and wound around the drum. Accordingly, the temperature of the cooling rolls is preferably (Tg+30)° C. or lower, more preferably in the range of (Tg−5)° C. to (Tg−45)° C., where Tg is the glass transition temperature of the resin of the layer which is extruded from the die and brought into contact with the drum. Thereby, problems such as sliding and flaws can be prevented.

It is preferable to reduce the amount of the residual solvent in the multilayer film. Examples of the means therefor may include (1) means to reduce the residual solvent included in the resin "a" and the resin "b" used as raw materials; and (2) means to pre-dry the resin "a" and the resin "b" before forming the multilayer film. The pre-drying is performed using a hot air dryer, etc. after the resin "a" and the resin "b" are formed into, e.g., a pellet form. The drying temperature is preferably 100° C. or higher, and the drying time is preferably 2 hours or longer. By performing the pre-drying, the amount of the residual solvent in the multilayer film can be reduced, and occurrence of bubbles in the extruded film-shaped resins can be prevented.

[2-2. Method for Manufacturing Phase Difference Film]

When the phase difference film with Re and $R_{40}$ satisfying the relationship of $0.92 \leq R_{40}/Re \leq 1.08$ is manufactured as the multilayer film of the present invention, usually, the phase difference film is manufactured by a manufacturing method including: a co-extrusion step of co-extruding the resin "b" and the resin "a" to obtain a specific pre-stretch film; a first stretching step of subjecting the pre-stretch film to a uniaxial stretching treatment in one direction at a specific temperature; and a second stretching step of performing a uniaxially stretching treatment in a direction orthogonal to the direction for the uniaxial stretching treatment performed in the first stretching step at a specific temperature different from that in the first stretching step. This manufacturing method will be described hereinbelow in detail.

Co-Extrusion Step

In the co-extrusion step, the resin "b" and the resin "a" are co-extruded to manufacture a specific pre-stretch film. Since the phase difference film is manufactured by stretching the pre-stretch film, the pre-stretch film includes: a layer B formed of the resin "b"; and layers A formed of the resin "a" and formed on both surfaces of the layer B. Accordingly, the pre-stretch film corresponds to the multilayer film of the present invention.

The pre-stretch film is stretched at different angles approximately orthogonal to each other at different temperatures T1 and T2, whereby retardation is expressed in each of the layers A and the layer B depending on the temperatures T1 and T2 and the stretching directions. In this manner, the retardation generated in the layers A is combined with the retardation generated in the layer B to express desired retardation as the entire phase difference film. The term "approximately orthogonal" refers to intersecting at an angle of usually 85° or larger and preferably 89° or larger, and usually 95° or smaller and preferably 91° or smaller.

The magnitude of the retardation expressed by stretching in the layers A and the layer B is determined depending on the Thickness of the pre-stretch film, the stretching temperature, the stretching ratio, and others. For this reason, it is preferable that the configuration of the pre-stretch film is set in accordance with the retardation that is desired to be expressed.

The specific configuration of the pre-stretch film may be set in a variety of manners. Especially, it is preferable that the pre-stretch film satisfies the following requirement (appropriately referred to hereinbelow as a "requirement P").

The requirement P: the pre-stretch film causes a phase delay when the pre-stretch film is uniaxially stretched in a direction of an X-axis at a temperature T1, and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane (appropriately referred to hereinbelow as "XZ polarized light") with respect to a phase of linearly polarized light incident perpendicularly on the film surface and having a plane of vibration of an electric vector lying in a YZ plane (appropriately referred to hereinbelow as "YZ polarized light") wherein the X-axis is a direction in a certain direction (i.e., a direction of uniaxial stretching), the Y-axis is a direction in a film plane orthogonal to the direction of uniaxial stretching, and the Z-axis is a direction of a thickness of the film.

It is sufficient that the aforementioned requirement P is satisfied when at least one of a variety of directions in the plane of the pre-stretch film is taken as the X-axis. Usually, the pre-stretch film is an isotropic raw film. Therefore, when the aforementioned requirement P is met with one in-plane direction taken as the X-axis, the requirement P is also met with any other directions taken as the X-axis.

In a film in which a slow axis appears along the X-axis by uniaxial stretching, the phase of the XZ polarized light usually causes a phase delay with respect to the phase of the YZ polarized light. In contrast, in a film in which a fast axis appears along the X-axis by uniaxial stretching, the phase of the XZ polarized light usually causes a phase advancement with respect to the phase of the YZ polarized light. The pre-stretch film according to the present invention is a multilayer film that utilizes these properties and is a film in which the appearance of the slow axis or fast axis depends on stretching temperature. Such temperature dependence of retardation expression may be controlled by, e.g., adjusting the photoelastic coefficient of the resin "a" and the resin "b" as well as the relationships such as the ratio of the thicknesses of the respective layers.

The in-plane retardation of a certain layer is a value determined by multiplying a thickness d by the difference between a refractive index nx in the X-axis direction which is the stretching direction and a refractive index ny in the Y-axis direction which is a direction orthogonal to the stretching direction (=nx−ny). The retardation of the multilayer film including the layers A and the layer B is synthesized by the retardation of the layers A and that of the layer B. Therefore, in order to, e.g., set the positivity/negativity of the expressed retardation in the entire film by stretching at higher temperature $T_H$ and that at a lower temperature $T_L$ are in reversed relationship, it is preferable to control the thicknesses of the layers A and the layer B such that the following (i) and (ii) are satisfied.

(i) By the stretching at the lower temperature $T_L$, the resin having a higher glass transition temperature expresses smaller absolute value of the retardation than the absolute value of the retardation that the resin having a lower glass transition temperature expresses.

(ii) By the stretching at the higher temperature $T_H$, the resin having a lower glass transition temperature expresses smaller absolute value of retardation than the absolute value of the retardation that the resin having a higher glass transition temperature expresses.

In this manner, as the resin composing the layers A and the layer B, combination of the resin "a" and the resin "b" that can generate the difference between the refractive index in the X-axis direction and the refractive index in Y-axis direction in each of the layers A and the layer B by stretching in one direction (i.e., uniaxial stretching) is selected. Furthermore, in consideration of the stretching conditions, the total thickness of the layers A and the total thickness of the layer B are adjusted. By doing these, the pre-stretch film satisfying the aforementioned requirement P may be obtained.

The temperature T1 is one of $T_H$ and $T_L$, and the temperature T2 is the other one of $T_H$ and $T_L$ that is different from T1.

Figure 2:
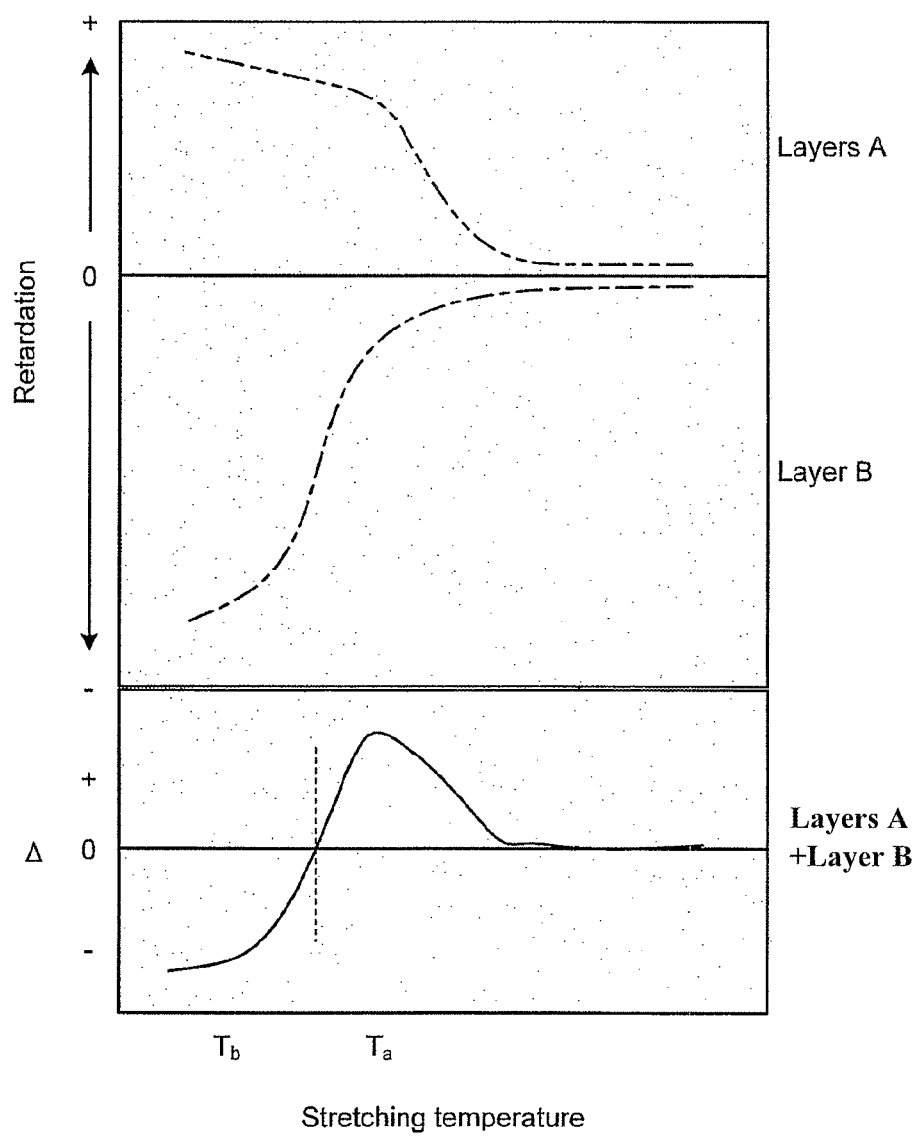
FIG. 2 is a graph showing an example of temperature dependence of retardation of each of layers A and a layer B of the pre-stretch film when the layers A and the layer B are each stretched, and the temperature dependence of the retardation Δ of the pre-stretch film (in this case, the layers A+the layer B) when the pre-stretch film is stretched.

The retardation expression upon the stretching of the pre-stretch film satisfying the aforementioned requirement P will be specifically described with reference to the drawing. FIG. 2 is a graph showing an example of temperature dependence of retardation of each of layers A and a layer B of the pre-stretch film when the layers A and the layer B are each stretched, and the temperature dependence of the retardation Δ of the pre-stretch film (in this case, the layers A+the layer B) when the pre-stretch film is stretched. FIG. 2 shows an instance wherein it is assumed that a glass transition temperature $Tg_A$ of the resin "a" forming the layers A is high and a glass transition temperature $Tg_B$ of the resin "b" forming the layer B is low.

As shown in FIG. 2, when the pre-stretch film is stretched at the temperature $T_b$, negative retardation expressed in the layer B is larger than positive retardation expressed in the layers A, so that the layers A+the layer B expresses negative retardation Δ. On the other hand, when the film is stretched at the temperature $T_a$, negative retardation expressed in the layer B is smaller than positive retardation expressed in the layers A, so that the layers A+the layer B expresses positive retardation Δ. Therefore, by the combination of such stretching operations at different temperatures $T_a$ and $T_b$, the retardations generated at the respective temperatures are combined, and a phase difference film having the desired retardation can thereby be realized.

An example of the structure of the pre-stretch film may be as follows. When the resin "b" is a resin including a styrene-maleic anhydride copolymer, the ratio of the total thickness of the layers A relative to the total thickness of the layer B (the total thickness of the layers A/the total thickness of the layer B) is usually 1/15 or more, preferably 1/10 or more, and usually 1/4 or less. When the layers A are too thick or the layer B is too thick, the temperature dependence of retardation expression tends to become small.

The total thickness of the pre-stretch film is preferably 10 µm or more, more preferably 20 µm or more, and particularly preferably 30 µm or more, and preferably 500 µm or less, more preferably 400 μm or less, and particularly preferably 300 μm or less. If the thickness of the pre-stretch film is lower than the lower limit of the aforementioned range, expression of retardation tends to be insufficient, and mechanical strength tends to become weak. If the thickness of the pre-stretch film is larger than the upper limit of the aforementioned range, flexibility can be impaired, and handling may become difficult.

When the number of layers A in the pre-stretch film is two, it is preferable that the ratio of the thickness of one layer A relative to that of the other layer A (the thickness of the thicker layer A/the thickness of the thinner layer A) is 1.5/1 or more in view of surely preventing light leakage of the polarizing plate when the film is combined with a polarizing plate in a liquid crystal display device. The ratio of the thickness of one layer A and that of the other layer A is preferably 10/1 or less in view of keeping the accuracy of the thickness of the thinner one of the layers A.

In the pre-stretch film, it is preferable that thickness variations of the layers A and the layer B in the entire surface are 0.1 μm or less. By having such a small variation, variation in the thickness of the layers A and the layer B of the phase difference film in the entire surface can also be made to be 1 μm or less, and variation in color tone of the display device including the phase difference film can be reduced. In addition, changes in the color tone of the phase difference film after long-term use can be made uniform. The lower limit of the variation in the thickness of the aforementioned layers A and layer B is ideally zero.

In order to reduce the variation in the thickness of the layers A and the layer B in the entire surface to be 1 μm or less as described above, the following (1) to (6) may be carried out.
(1) A polymer filter with a mesh of 20 μm or smaller is provided in an extruder.
(2) The gear pump is rotated at 5 rpm or faster.
(3) Enclosing means is provided around the die.
(4) The air gap is set to 200 mm or smaller.
(5) Edge pinning is performed when the film is casted onto the cooling roll.
(6) A twin screw extruder or a single screw extruder having a double flight type screw is used as the extruder.

In addition, the variation in the thickness of the layers A and the layer B can also be reduced by, e.g., measuring the thicknesses of the layers A and the layer B during manufacture and performing feedback control based on the thickness as in the embodiment which will be described later.

The variation in the thickness of the layers A and the layer B is obtained by measuring the thicknesses of the film in the MD direction and TD direction at regular intervals and calculating from the following formula with the maximum value $T_{max}$ and the minimum value $T_{min}$ of the measured thickness T with reference to the arithmetic average $T_{ave}$ of the measured values. The variation in thickness (μm) is defined as the larger one of $T_{ave}-T_{min}$ and $T_{max}-T_{ave}$.

The pre-stretch film that has been described in the above is usually manufactured by co-extrusion method. The co-extrusion method is as described in the above.

The pre-stretch film for use is usually an isotropic raw material film. However, a film that has already been subjected to a stretching treatment may be used as the pre-stretch film, and the film may be further subjected to a stretching treatment.

First Stretching Step

In the first stretching step, the pre-stretch film is subjected to a uniaxial stretching treatment in one direction at either the temperature T1 or T2. When stretched at the temperature T1, phase delay of the XZ polarized light with respect to the phase of the YZ polarized light occurs in the pre-stretch film satisfying the requirement P. On the other hand, when uniaxially stretched at the temperature T2, phase advancement of the XZ polarized light with respect to the phase of the YZ polarized light occurs.

When the glass transition temperatures have a relationship of $Tg_A>Tg_B$, the temperature T1 is preferably higher than $Tg_B$ and more preferably higher than $Tg_B+5°$ C., and preferably lower than $Tg_A+40°$ C. and more preferably lower than $Tg_A+20°$ C. By setting the temperature T1 to be higher than the lower limit of the aforementioned range, desired retardation can be stably expressed in the layer B, while by setting the temperature T1 to be lower than the upper limit, desired retardation can be stably expressed in the layers A.

Further, when the glass transition temperatures have a relationship of $Tg_A>Tg_B$, the temperature T2 is preferably higher than $Tg_B-20°$ C. and more preferably higher than $Tg_B-10°$ C., and preferably lower than $Tg_B+5°$ C. and preferably lower than $Tg_B$. By setting the temperature T2 to be higher than the lower limit of the aforementioned range, the pre-stretch film can be prevented from being broken or being cloudy during stretching, while by setting the temperature T2 to be lower than the upper limit, desired retardation can be stably expressed in the resin B layer B.

When the glass transition temperatures have a relationship of $Tg_A>Tg_B$ in this manner, it is preferable to perform the first stretching step at the temperature T1.

When the glass transition temperatures have a relationship of $Tg_B>Tg_A$, the temperature T1 is preferably higher than $Tg_A$ and more preferably higher than $Tg_A+5°$ C., and preferably lower than $Tg_B+40°$ C. and more preferably lower than $Tg_B+20°$ C. By setting the temperature T1 to be higher than the lower limit of the aforementioned range, desired retardation can be stably expressed in the layers A, while by setting the temperature T1 to be lower than the upper limit, desired retardation can be stably expressed in the layer B.

Further, when the glass transition temperatures have a relationship of $Tg_B>Tg_A$, the temperature T2 is preferably higher than $Tg_A-20°$ C. and more preferably higher than $Tg_A-10°$ C., and preferably lower than $Tg_A+5°$ C. and preferably lower than $Tg_A$. By setting the temperature T2 to be higher than the lower limit of the aforementioned range, the pre-stretch film can be prevented from being broken or being cloudy during stretching, while by setting the temperature T2 to be lower than the upper limit, desired retardation can be stably expressed in the resin A layer A.

When the glass transition temperatures have a relationship of $Tg_B>Tg_A$ in this manner, it is preferable to perform the first stretching step at the temperature T2.

The uniaxial stretching treatment may be performed by any publicly known method. Examples of such a method may include: a method in which uniaxial stretching is performed in the MD direction by utilizing the difference in peripheral speed between rolls; and a method in which uniaxial stretching is performed in the TD direction using a tenter. Examples of the method for uniaxial stretching in the MD direction may include IR heating between rolls and a float process. Among these, the float process is preferred because thereby a phase difference film with high optical uniformity can be obtained. On the other hand, examples of the method for uniaxial stretching in the TD direction may include a tenter method.

In the uniaxial stretching treatment, a temperature difference along the TD direction may be generated in a stretching zone in order to reduce stretching unevenness and thickness unevenness. In order to generate a temperature difference in the TD direction in the stretching zone, any publicly known method may be used. For example, the degrees of opening of hot air nozzles are controlled in the TD direction, or IR heaters are arranged in the TD direction to control heating.

Second Stretching Step

The second stretching step is performed after the first stretching step. In the second stretching step, the film stretched in one direction in the first stretching step is subjected to uniaxial stretching treatment in the direction orthogonal to the uniaxial stretching direction in the first stretching step.

In the second stretching step, the uniaxial stretching treatment is performed at the temperature T2 or T1 which is different from that in the first stretching step. In the second stretching step, when the relationship between the glass transition temperatures is $Tg_A > Tg_B$, it is preferable to perform the uniaxial stretching treatment at the temperature T2. When $Tg_B > Tg_A$, it is preferable to perform the uniaxial stretching treatment at the temperature T1.

The difference between the temperature T1 and the temperature T2 is usually 5° C. or more, and preferably 10° C. or more. By setting such a large difference between the temperature T1 and the temperature T2, the desired retardation can be stably be expressed in the phase difference film. Although the upper limit of the difference between the temperature T1 and the temperature T2 is not limited, it is 100° C. or less in view of industrial productivity.

Any of the methods that may be employed for the uniaxial stretching treatment in the first stretching step may be applicable as the method for the uniaxial stretching treatment in the second stretching step. However, it is preferable that the uniaxial stretching treatment in the second stretching step is performed at a stretching ratio that is smaller than that in the uniaxial stretching treatment in the first stretching step. Specifically, the first stretching ratio is preferably 2 to 4 times, and more preferably 2.4 to 3.6 times. The second stretching ratio is preferably 1.1 to 2 times, and more preferably 1.1 to 1.5 times.

The combination of the stretching direction in the first stretching step and the stretching direction in the second stretching step may be a combination of stretching in the MD direction in the first stretching step and stretching in the TD direction in the second stretching step, a combination of stretching in the TD direction in the first stretching step and stretching in the MD direction in the second stretching step, and a combination of stretching in a diagonal direction in the first stretching step and stretching in a diagonal direction orthogonal to the aforementioned diagonal direction in the second stretching step. Particularly, it is preferable to perform the stretching in the TD direction in the first stretching step and then in the MD direction in the second stretching step. This is because, when the stretching at a small stretching ratio in the second stretching step is performed in the MD direction, unevenness in the direction of the optical axis of the obtained phase difference film can be reduced over its entire width.

By performing the first stretching step and the second stretching step of the pre-stretch film in the aforementioned manner, retardation is generated in the layers A and the layer B in each of the first stretching step and the second stretching step, depending on the stretching temperatures, stretching directions, stretching ratios, etc. Therefore, in the phase difference film which is obtained after the first stretching step and the second stretching step, the retardation in the layers A and the retardation in the layer B that are expressed during the first stretching step and the second stretching step are combined, whereby the desired retardation is generated.

By co-stretching the pre-stretch film including the layers A and the layer B, manufacturing steps can be curtailed, and manufacturing cost can be reduced, as compared with an instance wherein the phase difference film is manufactured by attaching the layers A and the layer B each of which has been separately stretched. The layer B formed of the resin "b" having a negative intrinsic birefringence value alone cannot be easily stretched, and stretching of the layer B alone may cause stretching unevenness and fracture. However, by lamination of the layer B with the layers A, stable co-stretching can be performed, and unevenness in the thickness of the layer B can be reduced.

Other Steps

In the aforementioned method for manufacturing the phase difference film, an optional step may be performed in addition to the co-extrusion step, the first stretching step, and the second stretching step.

For example, a step of pre-heating the pre-stretch film (a pre-heating step) may be performed before stretching the pre-stretch film. Examples of the means for heating the pre-stretch film may include an oven-type heater, a radiation heater, and immersion into a liquid. Among these, the oven-type heater is preferable. The heating temperature in the pre-heating step is usually the stretching temperature–40° C. or higher and preferably the stretching temperature–30° C. or higher, and usually the stretching temperature+20° C. or lower and preferably the stretching temperature+15° C. or lower. The stretching temperature means the temperature at which the heater's temperature is set.

For example, after the first stretching step, the second stretching step, or both of them, the stretched film may be subjected to a fixing treatment. The temperature for the fixing treatment is usually a room temperature or higher and preferably the stretching temperature–40° C. or higher, and usually the stretching temperature+30° C. or lower and preferably the stretching temperature+20° C. or lower.

In addition, the step of providing, e.g., a mat layer, a hard coating layer, an anti-reflection layer, and an antifouling layer on, e.g., the surface of the obtained phase difference film may be performed.

[2-3. Feedback Control Based on Thickness]

The multilayer film of the present invention can be measured for the thicknesses of the layers A and the layer B even during in-line manufacture if an interference thickness meter is used. Accordingly, it is possible to perform thickness measurement for the layers A and the layer B during manufacture, and to perform feedback control of manufacturing conditions based on the measured thicknesses. Such feedback control enables precise control of the thicknesses of the layers A and the layer B of the multilayer film, so that a phase difference film having desired retardation can be stably manufactured.

Figure 3:
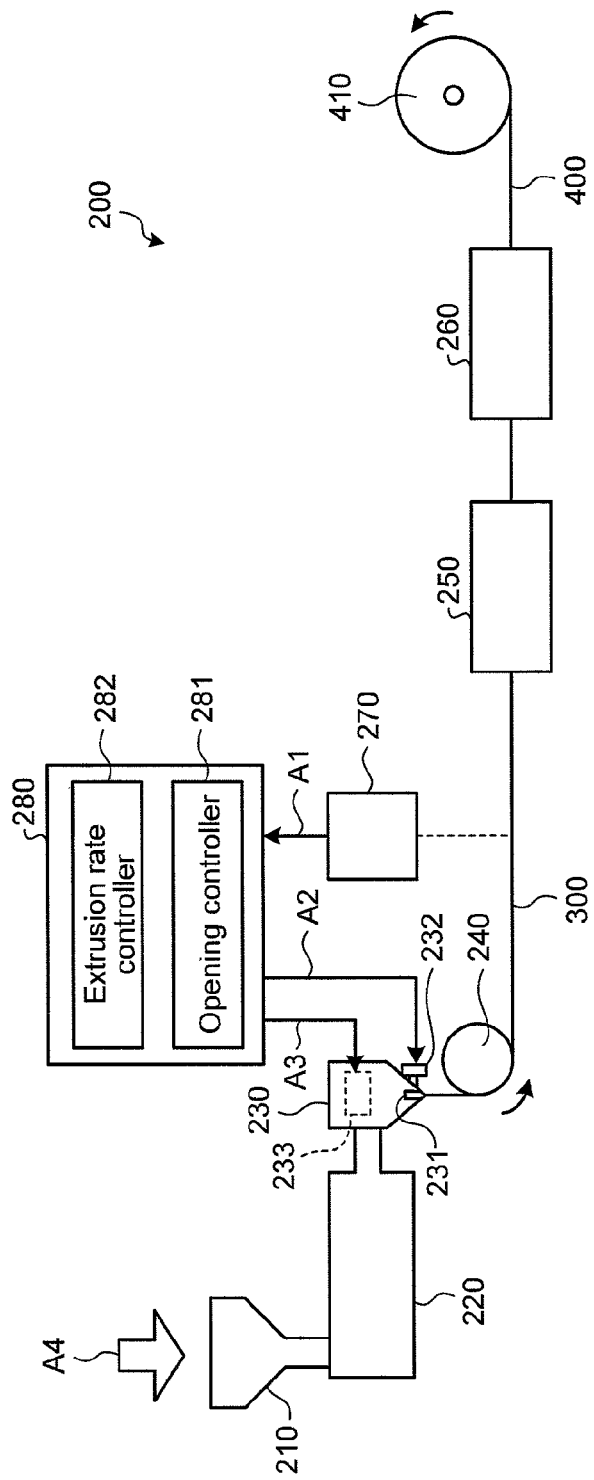
FIG. 3 is a schematic diagram of a system for manufacturing the phase difference film according to one embodiment of the method for manufacturing the multilayer film of the present invention.

FIG. 3 is a schematic diagram of a system for manufacturing the phase difference film according co one embodiment of the method for manufacturing the multilayer film of the present invention. In a manufacturing system 200 shown in FIG. 3, a pre-stretch film 300 is manufactured as the multilayer film of the present invention and the pre-stretch film 300 is stretched to manufacture a phase difference film 400.

As shown in FIG. 3, the manufacturing system 200 includes a hopper 210, an extruder 220, a die 230, a cooling roll 240, a first stretching machine 250, a second stretching machine 260, an interference thickness meter 270, and a control device 280.

The hopper 210 is a device which can supply the resin "a" and the resin "b" to the extruder 220. The extruder 220 is a device which can send the resin "a" and the resin "b" in a melted state out to the die 230, e.g., by a screw (not shown). The resin "a" and the resin "b" which have been supplied to the extruder 220 from the hopper 210 are each sent out to the die 230 from the extruder 220 by the screw.

The die 230 has a slit 231 as an opening which can co-extrude the resin "a" and the resin "b" in a melted state. The shape of the slit 231 is set in accordance with the width of the pre-stretch film 300 as the multilayer film, and the thicknesses of the layers A and the layer B. Specifically, the slit length is set in accordance with the width of the pre-stretch film 300 and the slit width is set in accordance with the thickness of each of the layers A and the layer B. A passage (not shown) through which the resin "a" and the resin "b" flow is formed inside the die 230, and the resin "a" and the resin "b" which are sent from the extruder 220 pass through the passage of the die 230 and are co-extruded from the slit in a state of a film having a layer of the resin "a", a layer of the resin "b", and a layer of the resin "a" in this order.

The slit 231 of the die 230 is provided with adjusting bolts 232 at a plurality of positions in the longitudinal direction of the slit 231. The adjusting bolts 232 are controllers which can adjust the size of the slit 231 (specifically, slit width), and are loosened or fastened by a suitable mechanism (not shown). Accordingly, the slit width of the slit 231 is adjustable with the adjusting bolts 232, and it can be increased by loosening the adjusting bolts 232 and decreased by fastening them.

Furthermore, the die 230 is provided with a heater 233 for heating the resin "a" and the resin "b" independently which flow through the passage. The temperature of the heater 233 is adjustable and thus the temperature of the resin "a" and the resin "b" which flow through the passage can be controlled by adjusting the temperature of the heater 233. Accordingly, the heater 233 functions as a controller of the extrusion rate and adjusts the viscosity of the resin "a" and the resin "b" by controlling the temperature, thereby enabling adjustment of the extrusion rate (i.e., the rate at which the resin is extruded) of one or both of the resin "a" and the resin "b" which are extruded from the slit 231.

The cooling roll 240 is a roll which can cool the resin "a" and the resin "b" which have been co-extruded in a film shape from the slit 231 of the die 230. The melted resin "a" and resin "b" are cured by being cooled on the cooling roll 240 to provide the pre-stretch film 300 as the multilayer film of the present invention. The obtained pre-stretch film 300 is sent to the first stretching machine 250 and subsequently sent to the second stretching machine 260.

The first stretching machine 250 is a device which can perform uniaxial stretching treatment of the pre-stretch film 300 in one direction at either the temperature T1 or T2. The second stretching machine 260 is a device which can perform uniaxial stretching treatment of the pre-stretch film 300, which has been stretched by the first stretching machine 250, in the direction orthogonal to the uniaxial stretching direction by the first stretching machine 250 at the temperature T2 or T1 which is different from that in the uniaxial stretching by the first stretching machine 250. Accordingly, the uniaxial stretching in the first stretching machine 250 and the second stretching machine 260 causes desired retardation to be expressed in the pre-stretch film 300, thereby providing the phase difference film 400.

The interference thickness meter 270 is a measuring instrument which can measure the thickness of each of the layers A formed of the resin "a" and the layer B formed of the resin "b" of the pre-stretch film 300. The interference thickness meter 270 measures the thickness of each of the layers A and the layer B by irradiating the conveyed pre-stretch film 300 with light and detecting the reflected light. The measured value is sent to the control device 280 as indicated by an arrow A1.

The control device 280 includes an opening controller 281 which can adjust the slit width of the slit 231 of the die 230. The opening controller 281 can adjust the slit width of the slit 231 to a desired size at a desired position by control, such as loosening or fastening, of the adjusting bolts 232 as indicated by an arrow A2. In this case, the opening controller 281 can adjust the slit width of the slit 231 in accordance with the thickness of each of the layers A and the layer B which have been sent from the interference thickness meter 270, such that the variation in the thickness of the pre-stretch film 300 in the TD direction is reduced and the variation in the total thickness of the pre-stretch film 300 in the MD direction is reduced.

The control device 280 includes an extrusion rate controller 282 for adjusting the extrusion rate of one or both of the resin "a" and the resin "b" by controlling the heating temperature of the heater 233. The extrusion rate controller 282 can adjust the viscosity of one or both of the resin "a" and the resin "b" by controlling the temperature of the heater 233 provided in the die 230 as indicated by an arrow A3, to adjust the extrusion rate of one or both of the resin "a" and the resin "b" extruded from the slit 231 of the die 230. In this case, the extrusion rate controller 282 can adjust the extrusion rate of one or both of the resin "a" and the resin "b" in accordance with the thickness of each of the layers A and the layer B sent from the interference thickness meter 270 such that the variation in the thickness of each of the layers A and the layer B in the MD direction is reduced.

The hardware configuration of the control device 280 is not limited, but the control device 280 is usually composed of a computer including a processor such as CPU, memories such as RAM and ROM, and interfaces such as an input/output terminal. The control device 280 performs controlling in accordance with the control content that has been previously recorded in, e.g., a memory.

Since the manufacturing system 200 of the present embodiment is Configured as described above, the resin "a" and the resin "b" are supplied to the hopper 210 as indicated by an arrow A4 when the phase difference film 400 is manufactured. The supplied resin "a" and resin "b" are sent out to the die 230 by the extruder 220. The resin "a" and the resin "b" sent out to the die 230 are co-extruded from the slit 231 as melted resin in a film shape and cooled on the cooling roll 240 to provide the pre-stretch film 300 (co-extrusion step).

The pre-stretch film 300 is sent to the first stretching machine 250 and subjected to uniaxial stretching treatment (first stretching step). Subsequently, the pre-stretch film 300 which has been subjected to uniaxial stretching treatment by the first stretching machine 250 is sent to the second stretching machine 260 and subjected to uniaxial stretching treatment at different temperature in a different direction from those by the first stretching machine 250 (second stretching). Accordingly, desired retardation is expressed in the pre-stretch film 300 to obtain the phase difference film 400. The obtained phase difference film 400 is rolled up in the MD direction and collected as a roll 410.

In the present embodiment, the thickness of each of the layers A and the layer B of the pre-stretch film 300 is measured with the interference thickness meter 270 (measuring step) before the pre-stretch film 300 is subjected to uniaxial stretching treatment by the first drawing machine 250. The data of the measured thickness are sent to the control device 280.

In the control device 280, the opening controller 281 adjusts the slit width of the slit 231 by control, such as loosening or fastening, of the adjusting bolts 232 (opening adjustment step). In this step, in accordance with the thickness measured with the interference thickness meter 270, the opening controller 281 controls to decrease the slit width of the slit 231 at the position where the total thickness of the pre-stretch film 300 is thicker than the target value in the TD direction of the pre-stretch film 300 and increase the slit width of the slit 231 at the position where the total thickness is thinner than the target value. This can reduce the variation in the total thickness of the pre-stretch film 300 in the TD direction, so that the thickness of the pre-stretch film 300 and the phase difference film 400 in the TD direction can be precisely controlled, which in turn enables precise control of the retardation of the phase difference film 400.

Moreover, in accordance with the thickness measured with the interference thickness meter 270, the opening controller 281 controls to decrease the slit width of the slit 231 when the total thickness of the pre-stretch film 300 becomes larger than the target value in the MD direction of the pre-stretch film 300 and to increase the slit width of the slit 231 when the total thickness becomes smaller than the target value. This can reduce the variation in the total thickness of the pre-stretch film 300 in the MD direction, so that the thickness of the pre-stretch film 300 and the phase difference film 400 in the MD direction can be precisely controlled, which in turn enables precise control of the retardation of the phase difference film 400.

Furthermore, in the control device 280, the extrusion rate controller 282 controls the temperature of the heater 233 to adjust the viscosity of one or both of the resin "a" and the resin "b" and thus adjust the extrusion rate of one or both of the resin "a" and the resin "b" from the slit 231 (rate adjustment step). In this step, the extrusion rate controller 282 controls the extrusion rate in accordance with the thickness measured with the interference thickness meter 270 such that when each layer of the pre-stretch film 300 becomes thicker than the target value in the MD direction, the extrusion rate is decreased and adjusted to make the layer thinner and when each layer becomes thinner than the target value, the extrusion rate is increased and adjusted to the layer thicker. This can reduce the variation in the thickness of each layer of the pre-stretch film 300 in the MD direction, so that the thickness of each layer of the pre-stretch film 300 and the phase difference film 400 in the MD direction can be precisely controlled, which in turn enables precise control of the retardation of the phase difference film 400. With respect to temperature adjustment of the resin "a" and the resin "b" with the heater 233, e.g., Japanese Patent Application Laid-Open No. 2006-188018 A may be referred to.

One embodiment of the method for manufacturing the phase difference film using feedback control based on the thickness has been described above. The aforementioned embodiment may be further chanced for implementation.

For example, the interference thickness meter 270 may be provided between the first stretching machine 250 and the second stretching machine 260 to measure the thickness of the pre-stretch film 300 after uniaxial stretching by the first stretching machine 250 and before uniaxial stretching by the second stretching machine 260. For example, the interference thickness meter 270 may also be provided downstream of the second stretching machine 260 to measure the thickness of the phase difference film 400 after uniaxial stretching by the second stretching machine 260. In this case, it is preferable that each layer upon thickness measurement has a large thickness in view of enabling high accuracy of thickness measurement. Specifically, the thickness of each of the layers A and the layer B is preferably 3 μm or more, and more preferably 5 μm or more. The upper limit of the thickness is preferably 300 μm or less, and more preferably 250 μm or less. Furthermore, it is preferable that the thickness of each layer is different from other layers. Specifically, the difference in the thickness of each layer is preferably 3 μm or more and more preferably 5 μm or more, and preferably 300 μm or less and more preferably 250 μm or less.

In addition, e.g., control may also be made by only either the opening controller 281 or the extrusion rate controller 282.

In place of automatic control with the controller 280, a user may perform controlling based on the thickness of each of the layers A and the layer B measured with the interference thickness meter 270.

Furthermore, the manufacturing system 200 for the phase difference film 400 may include other components than those that have been described hereinabove.

[3. Liquid Crystal Display Device]

With the multilayer film of the present invention, a phase difference film with precisely controlled retardation can be realized, which enables high-level birefringence compensation. Accordingly, e.g., the multilayer film of the present invention can be applied alone or in combination with other members to display devices such as a liquid crystal display device, an organic electroluminescence display device, a plasma display device, a FED (field emission display) device, and a SED (surface-conduction electron-emitter display) device.

A liquid crystal display device usually includes a pair of polarizers (a light incident side polarizing plate and a light emitting side polarizing plate) having absorption axes approximately orthogonal to each other; and a liquid crystal cell provided between the pair of polarizers. When the multilayer film of the present invention is provided as a phase difference film in the liquid crystal display device, the multilayer film of the present invention may be provided, e.g., between the aforementioned pair of polarizers. In this case, the multilayer film of the present invention may be provided on the light incident side of the liquid crystal cell, or may be provided on the light emitting side of the liquid crystal cell.

Usually, the aforementioned pair of polarizers, the multilayer film of the present invention, and the liquid crystal cell are combined to constitute a single member called a liquid crystal panel, and image displaying on the display surface that is present on the light emitting side of the liquid crystal panel is achieved by irradiation of this liquid crystal panel with light from a light source. In this case, since the multilayer film of the present invention has precisely controlled retardation, it exerts an excellent polarizing plate compensation function and can reduce light leakage when the display surface of the liquid crystal display device is observed from an oblique angle. Furthermore, the multilayer film of the present invention usually has an excellent optical function in addition to the polarizing plate compensation function and thus can further improve the visibility of the liquid crystal display device.

Examples of the drive mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super-twisted nematic (STN) mode, and an optically compensated bend (OCB) mode. Among these, the in-plane switching mode and the vertical alignment mode are preferable, and the in-plane switching mode is particularly preferable. The liquid crystal cell of the in-plane switching mode has a wide viewing angle. By applying the multilayer film of the present invention as a phase difference film, the viewing angle can be further widened.

The multilayer film of the present invention may be attached to the liquid crystal cell or the polarizing plate. For example, the multilayer film may be attached to both surfaces of the polarizing plate, or may be attached to only one surface. For attaching, publicly known adhesives may be used.

One sheet of the multilayer film of the present invention may solely be used, or two or more sheets thereof may be used in combination.

Moreover, the multilayer film of the present invention may be used in combination with another phase difference plate when provided in a display device. For example, when the multilayer film of the present invention is provided as the phase difference film in the liquid crystal display device including the liquid crystal cell with a vertical alignment mode, another phase difference film for improving viewing angle characteristics may be provided between the pair of polarizers in addition to the multilayer film of the present invention.

[4. Other Matters]

The multilayer film of the present invention may be used as, e.g., a ¼ waveplate. In this case, the multilayer film of the present invention is manufactured as a ¼ waveplate by setting the in-plane retardation of the multilayer film of the present invention to 120 nm to 160 nm. This ¼ waveplate may be combined with a linear polarizer to provide a circularly polarizing plate. In this case, it is preferable that the angle formed between the retarded phase axis of the ¼ waveplate and the absorption axis of the linear polarizer is set to 45°±2°.

The multilayer film plate of the present invention may also be used as a protective film in the polarizing plate. The polarizing plate usually includes a polarizer and protective films attached to both surfaces of the polarizer. In this case, in place of the protective films, the multilayer films of the present invention may be attached to the polarizer so that the multilayer films may be used as the protective films. In this case, protective film is omitted and therefore reduction in thickness, weight and cost of the liquid crystal display device can be achieved.

EXAMPLES

The present invention will be specifically described hereinbelow by referring to Examples, but the present invention is not limited to the following Examples and may be optionally modified for implementation without departing from the scope of claims and equivalents thereto. In the following description, "%" and "part" expressing the amount are on a weight basis unless otherwise specified.

[Evaluation Method]
[Average Refractive Index]

The resin to be measured was pressed for 1 minute by an electrically-heated pressing machine adjusted at 200° C. to form a sample having a thickness of about 100 μm. The formed sample was measured at a measuring wavelength of 532 nm using a refractive index thickness measuring device ("Prism Coupler" produced by Metricon Corporation).

[Thickness Measurement with Interference Thickness Meter]

An interference thickness meter (produced by Otsuka Electronics Co., Ltd.) was used for measuring the thicknesses of a resin layer A1, a resin layer B1, a resin layer A2, and the entire film of the pre-stretch film. The measured values of the thicknesses of the resin layer A1, the resin layer A2, and the entire film are employed, and the thickness of the resin layer B1 is obtained by calculating the difference between the thickness of the entire film and the thicknesses of the resin layer A1 and the resin layer A2.

[Stability of Thickness Measurement with Interference Thickness Meter]

The interference thickness meter (produced by Otsuka Electronics Co., Ltd.) was used for measuring the thicknesses of the resin layer A1, the resin layer A2, and the entire film of the pre-stretch film. Measurement was repeated 5 times at the same position of the same sample. When all values for the resin layer A1, the resin layer A2, and the entire film in the five measurements were within ±1%, it was evaluated as "A". When one to 4 measurements were within ±1%, it was evaluated as "B". When one or no measurements were within ±1%, it was evaluated as "C."

[Thickness Measurement Under Microscope]

The pre-stretch film was embedded in epoxy resin and then sliced using a microtome ("RUB-2100" produced by Yamato Kohki Industrial Co., Ltd.). The cross-section of the pre-stretch film was observed under a scanning electron microscope to measure the thicknesses of the resin layer A1, the resin layer B1, the resin layer A2, and the entire film of the pre-stretch film.

[Measurement of Retardation]

The stretched film was measured for retardation Re at an incident angle of 0° and retardation $R_{40}$ at an incident angle of 40° using an automatic birefringence analyzer ("KOBRA-21ADH" produced by Oji Scientific Instruments) at a measuring wavelength of 590 nm.

[Measurement of Glass Transition Temperature (Tg)]

The resin to be measured was measured by the differential scanning calorimetry (DSC) using a differential scanning calorimeter ("DSC-6200" produced by Seiko Instruments Inc.) at a heating rate of 10° C./min in accordance with JIS K7121.

[Evaluation of Durability During Stretching]

A monolayer film of the resin that is for forming the resin layer B1 used in each of Examples and Comparative Example was formed using a small-size monolayer extruded film forming apparatus. The monolayer film thus formed was stretched over 1 minute to 1.5 times at the glass transition temperature of the resin forming the monolayer film, using a tensile tester (produced by Instron Japan Company, Ltd.). The stretched film was measured for the retardation Re at an incident angle of 0°, and the measured value at that time was taken as Re (bef). This film was left stand for 500 hours in a constant temperature constant humidity room regulated at 80° C. and 60% humidity. After this treatment, the value of the retardation Re at an incident angle of 0° was measured, which was taken as Re (aft). It is defined that (Re(aft)−Re(bef))/Re(bef)×100 durability (%). When the durability was less than 5%, it was evaluated as "A". When 5% or more, it was evalulated as "B".

[Interlayer Peel Strength]

A film having a layer structure of (the polycarbonate resin)/(the resin forming the resin layer B1)/(the polycarbonate resin) was formed using the polycarbonate resin and the resin forming the resin layer B1 which were used in each of Examples and Comparative Example with the small-size multilayer extruded film forming apparatus. From this film, a film piece in a strip shape with 10-mm width was cut out as a test piece, and a 180° peel test was carried out at a pulling rate of 100 mm/min. When cohesive failure occurred in the interface, it was evaluated as "A". When cohesive failure partially occurred, it was evaluated as "B". When peeling occurred in the interface, it was evaluated as "C".

Example 1

[Production of Pre-Stretch Film]

A film forming apparatus for two-material three-layer co-extrusion molding (a type for forming a film formed of two kinds of resin and composed of three layers) was prepared.

Pellets of a polycarbonate resin ("Wonderlite PC-115" produced by Asahi Kasei Corporation, glass transition temperature: 145° C.) was charged into one of uniaxial extruders equipped with a double flight type screw, and the resin was melted. This polycarbonate resin corresponds to the resin "a" having a positive intrinsic birefringence value.

Pellets of styrene-maleic anhydride copolymer resin ("Dylark D332" produced by Nova Chemicals, content of maleic anhydride units: 17% by weight, glass transition temperature: 129° C.) and pellets of polymethyl methacrylate resin ("Delpet 80NH" produced by Asahi Kasei Chemicals Corporation, glass transition temperature: 110° C.) were mixed at a weight ratio of 85:15. The glass transition temperature of the mixed resin was 126° C. This was charged into the other uniaxial extruder equipped with a double flight type screw, and the resin was melted. This mixed resin including the styrene-maleic anhydride copolymer resin and the polymethyl methacrylate resin corresponds to the resin "b" having a negative intrinsic birefringence value.

The melted polycarbonate resin at 260° C. was supplied to one of the manifolds of a multi-manifold die (die lip surface roughness Ra=0.1 μm) through a leaf disk shaped polymer filter with a mesh of 10 μm. On the other hand, the melted mixed resin of the styrene-maleic anhydride copolymer resin and the polymethyl methacrylate resin at 260° C. was supplied to the other manifold through a leaf disk shaped polymer filter with a mesh of 10 μm.

The polycarbonate resin and the mixed resin of the styrene-maleic anhydride copolymer resin and the polymethyl methacrylate resin were simultaneously extruded from the multi-manifold die at 260° C., to make them in a film shape. This melted resin co-extruded in a film shape had a three-layer structure formed of (a polycarbonate resin layer)/(a mixed resin layer of the styrene-maleic anhydride copolymer resin and the polymethyl methacrylate resin)/(a polycarbonate resin layer).

The melted resin which was thus co-extruded in a film shape was cast onto a cooling roll having the surface temperature regulated at 115° C. and then passed between two cooling rolls having the surface temperature regulated at 120° C. to obtain a pre-stretch film (co-extrusion step). The pre-stretch film thus obtained had a three-layer structure having the polycarbonate resin layer (resin layer A1), the mixed resin layer of the styrene-maleic anhydride copolymer resin and the polymethyl methacrylate resin (resin layer B1), and the polycarbonate resin layer (resin layer A2) in this order. The obtained pre-stretch film had a width of 600 mm. As to the obtained pre-stretch film, thickness measurement with the interference thickness meter, thickness measurement with under the microscope, and evaluation for the stability of the thickness measurement with the interference thickness meter were performed. The results are shown in Table 1.

This pre-stretch film was uniaxially stretched in the longitudinal direction of the film at a stretching temperature of 150° C. and a stretching ratio of 1.25 times. For the film after being stretched, the retardation Re of linearly polarized light which was incident perpendicular to a film plane and had an oscillation plane of electric vector on the XZ plane relative to linearly polarized light which was incident perpendicular to the film plane and had an oscillation plane of electric vector on the YZ plane, wherein the uniaxial stretching direction was defined as the X-axis, the direction orthogonal to the uniaxial stretching direction in the film plane was defined as the Y-axis, and the thickness direction of the film was defined as the Z-axis, was measured. The measured value was 74.4 mm, and it was thus found that the phase was delayed.

For the aforementioned pre-stretch film, the retardation Re of linearly polarized light which was incident perpendicular to a film plane after stretching and had an oscillation plane of electric vector on the XZ plane relative to linearly polarized light which was incident perpendicular to the film plane and had an oscillation plane of electric vector on the YZ plane was measured in the same manner as described above, except that the stretching temperature was set to 130° C. The retardation Re was −160.4 mm, and it was found that the phase was advanced.

[Production of Stretched Film]

The aforementioned pre-stretch film was supplied to a tenter crosswise uniaxial stretching machine and stretched in the crosswise direction at a stretching temperature of 150° C. and a stretching ratio of 3.0 (first stretching step). Subsequently, the stretched film was supplied to a longitudinal uniaxial stretching machine and stretched in the longitudinal direction at a stretching temperature of 126° C. and a stretching ratio of 1.2 to obtain a phase difference film (second stretching step). The stretching temperature in the aforementioned second stretching step is the glass transition temperature of the mixed resin forming the layer B. In the obtained phase difference film, the retarded phase axis of the resin layer A1, the retarded phase axis of the resin layer B, and the retarded phase axis of the resin layer A2 were approximately parallel to one another. The obtained stretched film was measured for the retardation. The results are shown in Table 1.

Example 2

A pre-stretch film and a stretched film were produced and evaluated in the same manner as in Example 1 except that the weight ratio of the styrene-maleic anhydride copolymer resin and polymethyl methacrylate resin was changed to 75:25 and the stretching temperature in the second stretching step was changed to 124° C. The results are shown in Table 1.

The pre-stretch film was uniaxially stretched in the same, manner as in Example 1, and the retardation Re of linearly polarized light which was incident perpendicular to a film plane and had an oscillation plane of electric vector on the XZ plane relative to linearly polarized light which was incident perpendicular to the film plane and had an oscillation plane of electric vector on the YZ plane was measured. The retardation Re for uniaxial stretching at a stretching temperature of 150° C. and a stretching ratio of 1.25 times was 77.7 nm, and it was found that the phase was delayed. On the other hand, the retardation Re for uniaxial stretching at a stretching temperature of 130° C. and a stretching ratio of 1.25 times was −139.0 nm, and it was found that the phase was advanced.

Example 3

A pre-stretch film and a stretched film were produced and evaluated in the same manner as in Example 1 except that the weight ratio of the styrene-maleic anhydride copolymer resin and polymethyl methacrylate resin was changed to 65:35 and the stretching temperature in the second stretching step was changed to 122° C. The results are shown in Table 1.

The pre-stretch film was uniaxially stretched in the same manner as in Example 1, and the retardation Re of linearly polarized light which was incident perpendicular to a film plane and had an oscillation plane of electric vector on the XZ plane relative to linearly polarized light which was incident perpendicular to the film plane and had an oscillation plane of electric vector on the YZ plane was measured. The retardation Re for uniaxial stretching at a stretching temperature of 150° C. and a stretching ratio of 1.25 times was 81.7 nm, and it was found that the phase was delayed. On the other hand, the retardation Re for uniaxial stretching at a stretching temperature of 130° C. and a stretching ratio of 1.25 times was −113.7 nm, and it was found that the phase was advanced.

Example 4

A pre-stretch film and a stretched film were produced and evaluated in the same manner as in Example 1 except that the weight ratio of the styrene-maleic anhydride copolymer resin and polymethyl methacrylate resin was changed to 95:5 and the stretching temperature in the second stretching step was changed to 128° C. The results are shown in Table 1.

The pre-stretch film was uniaxially stretched in the same manner as in Example 1, and the retardation Re of linearly polarized light which was incident perpendicular to a film plane and had an oscillation plane of electric vector on the XZ plane relative to linearly polarized light which was incident perpendicular to the film plane and had an oscillation plane of electric vector on the YZ plane was measured. The retardation Re for uniaxial stretching at a stretching temperature of 150° C. and a stretching ratio of 1.25 times was 71.4 nm, and it was found that the phase was delayed. On the other hand, the retardation Re for uniaxial stretching at a stretching temperature of 130° C. and a stretching ratio of 1.25 times was −179.4 nm, and it was found that the phase was advanced.

Example 5

A pre-stretch film and a stretched film were produced and evaluated in the same manner as in Example 1 except that the weight ratio of the styrene-maleic anhydride copolymer resin and polymethyl methacrylate resin was changed to 50:50 and the stretching temperature in the second stretching step was changed to 119° C. The results are shown in Table 1.

The pre-stretch film was uniaxially stretched in the same manner as in Example 1, and the retardation Re of linearly polarized light which was incident perpendicular to a film plane and had an oscillation plane of electric vector on the XZ plane relative to linearly polarized light which was incident perpendicular to the film plane and had an oscillation plane of electric vector on the YZ plane was measured. The retardation Re for uniaxial stretching at a stretching temperature of 150° C. and a stretching ratio of 1.25 times was 91.4 nm, and it was found that the phase was delayed. On the other hand, the retardation Re for uniaxial stretching at a stretching temperature of 130° C. and a stretching ratio of 1.25 times was −51.8 nm, and it was found that the phase was advanced.

Comparative Example 1

A pre-stretch film and a stretched film were produced and evaluated in the same manner as in Example 1 except that the polymethyl methacrylate resin was not used and the stretching temperature in the second stretching step was changed to 129° C. The results are shown in Table 1.

The pre-stretch film was uniaxially stretched in the same manner as in Example 1, and the retardation Re of linearly polarized light which was incident perpendicular to a film plane and had an oscillation plane of electric vector on the XZ plane relative to linearly polarized light which was incidents perpendicular to the film plane and had an oscillation plane of electric vector on the YZ plane was measured. The retardation Re for uniaxial stretching at a stretching temperature of 150° C. and a stretching ratio of 1.25 times was 74.3 nm, and it was found that the phase was delayed. On the other hand, the retardation Re for uniaxial stretching at a stretching temperature of 130° C. and a stretching ratio of 1.25 times was −160.9 nm, and it was found that the phase was advanced.

TABLE 1

[Results of Examples and Comparative Example]

| | | | Ex. 1 | Ex. 2 | Ex. 3 | Ex. 4 | Ex. 5 | Comp. Ex. 1 |
|---|---|---|---|---|---|---|---|---|
| Layer structure (%) | Resin layer A1 | Polycarbonate resin | 100 | 100 | 100 | 100 | 100 | 100 |
| | Resin layer B1 | Styrene-maleic anhydride polymer resin | 85 | 75 | 65 | 95 | 50 | 100 |
| | | Polymethyl methacrylate resin | 15 | 25 | 35 | 5 | 50 | 0 |
| | Resin layer A2 | Polycarbonate resin | 100 | 100 | 100 | 100 | 100 | 100 |
| Thickness of pre-stretch film (μm) (interference) | Resin layer A1 | | 7.1 | 7.1 | 7.1 | 7.1 | 7.1 | Not measurable |
| | Resin layer B1 | | 188.6 | 202.0 | 217.6 | 176.8 | 235.0 | |
| | Resin layer A2 | | 19.5 | 19.5 | 19.5 | 19.5 | 19.5 | |

TABLE 1-continued

[Results of Examples and Comparative Example]

| | | Ex. 1 | Ex. 2 | Ex. 3 | Ex. 4 | Ex. 5 | Comp. Ex. 1 |
|---|---|---|---|---|---|---|---|
| Thickness of pre-stretch film (μm) (microscope) | Resin layer A1 | 7.0 | 7.1 | 7.1 | 7.1 | 7.2 | 7.1 |
| | Resin layer B1 | 188.7 | 202.1 | 217.6 | 176.6 | 235.1 | 169.9 |
| | Resin layer A2 | 19.5 | 19.5 | 19.5 | 19.4 | 19.5 | 19.5 |
| Average refractive index | Resin layer A1, A2 | 1.5931 | 1.5931 | 1.5931 | 1.5931 | 1.5931 | 1.5931 |
| | Resin layer B1 | 1.5693 | 1.5662 | 1.55558 | 1.5815 | 1.5416 | 1.5881 |
| Difference in average refractive index between resin layer A1, A2 and resin layer B1 | | 0.0238 | 0.0269 | 0.0375 | 0.0116 | 0.0515 | 0.0050 |
| Stability of thickness measurement | | A | A | A | B | A | C |
| Glass transition temperature (° C.) | Resin layer A1, A2 | 145 | 145 | 145 | 145 | 145 | 145 |
| | Resin layer B1 | 126 | 124 | 122 | 128 | 119 | 129 |
| Durability during stretching | | A | A | A | A | B | A |
| Re(nm) | | 166.2 | 167.1 | 168.1 | 168.8 | 167.4 | 169.7 |
| $R_{40}$(nm) | | 172.8 | 172.1 | 173.1 | 175.6 | 172.4 | 174.8 |
| $R_{40}$/Re | | 1.04 | 1.03 | 1.03 | 1.04 | 1.03 | 1.03 |
| Interlayer peel strength | | A | A | A | B | A | C (1.4 N/m) |

Discussion

As shown in Table 1, the difference in average refractive index of the resin between the resin layers A1 and A2 and she resin layer B1 was 0.01 or more, whereby the thicknesses of the resin layers A1 and A2 and the resin layer B1 was able to be measured. Among Examples, Example 4 with the difference in average refractive index of less than 0.02 resulted inferior to other Examples in terms of stability of thickness measurement. This shows that the difference in average refractive index is preferably 0.02 or more in view of stable thickness measurement.

Comparative Example 1 not including the polymethyl methacrylate resin resulted in low interlayer peel strength. In Example 4 with a smaller amount of polymethyl methacrylate resin, the interlayer peel strength is lower than that in other Examples. This shows that the interlayer adhesion is enhanced by including in the resin "b" the polymer which contains repeating units derived from an acrylic compound and there is a preferable range for the amount of the repeating units derived from the acrylic compound in view of effectively improving interlayer adhesion.

In addition, in Examples 5 with a larger amount of polymethyl methacrylate resin than other Examples, the durability during stretching is lower than other Examples. This shows that there is a preferable range for the amount of the repeating units derived from an acrylic compound in view of improving durability during stretching.

DESCRIPTION OF NUMERALS

100 Multilayer film
110 Layer B
111,112 Surface of layer B (interface between resin "a" and resin "b")
120,130 Layers A
140,150 Main surface of multilayer film 100
200 System for manufacturing phase difference film
210 Hopper
220 Extruder
230 Die
231 Slit (opening)
232 Adjusting bolt
233 Heater
240 Cooling roll
250 First stretching machine
260 Second stretching machine
270 Interference thickness meter
280 Control device
281 Opening controller
282 Extrusion rate controller
300 Pre-stretch film
400 Phase difference film
410 Roll of phase difference film

The invention claimed is:

1. A multilayer film, comprising a layer B formed of a resin "b" having a negative intrinsic birefringence value; and layers A formed of a resin "a" having a positive intrinsic birefringence value and formed on both surfaces of the layer B, wherein:
    the resin "b" includes a styrene-based polymer,
    the resin "a" includes a polycarbonate,
    a difference in average refractive index between the resin "b" and the resin "a" is 0.02 or more, and
    the resin "a" or the resin "b" includes a polymer containing a repeating unit derived from an acrylic compound, wherein an amount of the repeating unit derived from the acrylic compound in the polymer included in the resin "a" or the resin "b" is 10% by weight or more and 35% by weight or less.

2. The multilayer film according to claim 1, wherein the styrene-based polymer is a copolymer containing a repeating unit derived from maleic anhydride.

3. The multilayer film according to claim 1, wherein the multilayer film is formed by a co-extrusion method.

4. The multilayer film according to claim 1, wherein the multilayer film is a phase difference film whose retardation Re at an incident angle of 0° and retardation $R_{40}$ at an incident angle of 40° satisfy a relationship of $0.92 \leq R_{40}/Re \leq 1.08$.

5. A method for manufacturing the multilayer film according to claim 4, comprising:
    a co-extrusion step of co-extruding a resin "b" having a negative intrinsic birefringence value and a resin "a"

having a positive intrinsic birefringence value to obtain a pre-stretch film, wherein the pre-stretch film causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;

a first stretching step of subjecting the pre-stretch film to a uniaxial stretching treatment in one direction at either the temperature T1 or T2; and a second stretching step of performing a uniaxial stretching treatment in a direction orthogonal to the direction for the uniaxial stretching treatment performed in the first stretching step at the different one of the temperatures T2 and T1, wherein:

the resin "b" includes a styrene-based polymer;
the resin "a" includes a polycarbonate; and
a difference in average refractive index between the resin "b" and the resin "a" is 0.01 or more.

6. The manufacturing method according to claim 5, wherein:

in the co-extrusion step, the pre-stretch film is obtained by co-extruding the resin "a" and the resin "b" from a size-adjustable opening of a die, and the manufacturing method comprises: a measuring step of measuring a thickness of each of a layer formed of the resin "a" of the pre-stretch film and a layer formed of the resin "b" with an interference thickness meter; and an opening adjustment step of adjusting the size of the opening of the die in accordance with the measured thickness of each layer.

7. The manufacturing method according to claim 6, comprising a rate adjustment step of adjusting an extrusion rate of one or both of the resin "a" and the resin "b" in accordance with the measured thickness of each layer.

8. The multilayer film according to claim 1, wherein a ratio of a total thickness of the layers A relative to a total thickness of the layer B is 1/15 or more, and 1/4 or less.

9. The multilayer film according to claim 1, wherein a number of layers A is two, and a ratio of a thickness of one layer A relative to that of the other layer A is 1.5/1 or more, and 10/1 or less.

10. The multilayer film according to claim 1, having an in-plane retardation of 120 nm to 160 nm.

11. A circularly polarizing plate having the multilayer film according to claim 10 and a linear polarizer, wherein an angle formed between a retarded phase axis of the multilayer film and an absorption axis of the linear polarizer is 45°±2°.

12. A polarizing plate having a polarizer and protective films attached to both surfaces of the polarizer, wherein the protective films are the multilayer film according to claim 1.

13. The manufacturing method according to claim 5, wherein

TgA, TgB,
T1 and T2 satisfy:
TgA>TgB,
TgB<T1<TgB+40° C., and
TgB−20° C.<T2<TgB+5° C.,
wherein TgA is a glass transition temperature of the resin "a" and TgB is a glass transition temperature of a resin "b".

14. The multilayer film according to claim 2, wherein an amount of the repeating unit derived from maleic anhydride is 5 parts by weight or more and 30 parts by weight or less with respect to 100 parts by weight of styrene-based polymer.

* * * * *